United States Patent
Fong et al.

(10) Patent No.: US 12,273,320 B2
(45) Date of Patent: Apr. 8, 2025

(54) PHYSICAL HARDWARE CONTROLLER FOR PROVISIONING SECURITY SERVICES ON PROCESSING DEVICES

(71) Applicant: Dell Products L.P., Round Rock, TX (US)

(72) Inventors: Victor Fong, Melrose, MA (US); Kenneth Durazzo, Morgan Hill, CA (US)

(73) Assignee: Dell Products L.P., Round Rock, TX (US)

( * ) Notice: Subject to any disclaimer, the term of this patent is extended or adjusted under 35 U.S.C. 154(b) by 346 days.

(21) Appl. No.: 17/676,598

(22) Filed: Feb. 21, 2022

(65) Prior Publication Data

US 2023/0269225 A1     Aug. 24, 2023

(51) Int. Cl.
*H04L 9/40*     (2022.01)

(52) U.S. Cl.
CPC ........ *H04L 63/0236* (2013.01); *H04L 63/101* (2013.01); *H04L 63/1416* (2013.01)

(58) Field of Classification Search
CPC ............. H04L 63/0236; H04L 63/1433; H04L 63/1416; H04L 63/0245; H04L 63/101
See application file for complete search history.

(56) References Cited

U.S. PATENT DOCUMENTS

| 2002/0172207 | A1* | 11/2002 | Saito | H04L 45/00 |
| | | | | 370/389 |
| 2005/0114478 | A1* | 5/2005 | Popescu | H04L 12/1822 |
| | | | | 709/220 |
| 2008/0117909 | A1* | 5/2008 | Johnson | G06F 13/387 |
| | | | | 370/392 |
| 2011/0093575 | A1* | 4/2011 | Dube | G06F 15/16 |
| | | | | 709/250 |

(Continued)

OTHER PUBLICATIONS

Maxim Integrated, "USB On-The-Go (OTG): Uses and Support," https://www.maximintegrated.com/en/design/technical-documents/tutorials/1/1822.html, Tutorials 1822, Accessed Feb. 18, 2022, 3 pages.

(Continued)

*Primary Examiner* — Dao Q Ho
(74) *Attorney, Agent, or Firm* — Ryan, Mason & Lewis, LLP

(57) ABSTRACT

An apparatus comprises a first processing device, the first processing device comprising a physical hardware controller configured for coupling with a second processing device. The first processing device is configured to identify remote security service instances attached to the second processing device and to initiate, at the first processing device, one or more network emulation modules for the remote security service instances attached to the second processing device that emulate physical network interface devices configured for attachment to the second processing device. The first processing device is also configured to provision the remote (Continued)

security service instances to the second processing device by utilizing hardware resources of the physical hardware controller to analyze network traffic associated with the second processing device, to modify at least a portion of the network traffic, and to provide the modified network traffic to the second processing device via the emulated physical network interface devices.

20 Claims, 15 Drawing Sheets

(56) References Cited

U.S. PATENT DOCUMENTS

| | | | |
|---|---|---|---|
| 2012/0182860 A1* | 7/2012 | Liu | H04L 1/0076 370/216 |
| 2014/0237071 A1* | 8/2014 | Friman | G06F 16/9574 709/216 |
| 2015/0207665 A1* | 7/2015 | Basso | G06F 21/53 709/223 |
| 2016/0359897 A1* | 12/2016 | Yadav | H04L 67/10 |
| 2020/0278892 A1* | 9/2020 | Nainar | H04L 67/10 |
| 2020/0280592 A1* | 9/2020 | Ithal | H04L 67/1023 |
| 2023/0269225 A1* | 8/2023 | Fong | H04L 63/101 726/11 |

OTHER PUBLICATIONS

D. Adib, "What is Edge Computing?" https://stlpartners.com/articles/edge-computing/what-is-edge-computing/, Accessed, Jan. 21, 2022, 10 pages.

J. James, "The Telco Edge Cloud Explained," https://mobiledgex.com/blog/2021/05/27/the-telco-edge-cloud-explained/, May 27, 2021, 3 pages.

Raspberry Pi Ltd. "Raspberry Pi Zero 2 W," Oct. 2021, 6 pages.

Raspberry Pi Ltd. "Setting up your Raspberry Pi," https://www.raspberrypi.com/documentation/computers/getting-started.html, Accessed Feb. 18, 2022, 19 pages.

Cloudfoundry Foundation, Inc. "Open Service Broker API," https://www.openservicebrokerapi.org/, Accessed Feb. 18, 2022, 5 pages.

O. Michel et al., "The Programmable Data Plane: Abstractions, Architectures, Algorithms, and Applications," ACM Computing Surveys, vol. 1, No. 1, Jan. 2021, 35 pages.

M. Tork et al., "Lynx: A SmartNIC-driven Accelerator-centric Architecture for Network Servers," Architectural Support for Programming Languages and Operating Systems, Mar. 2020, 15 pages.

The Linux Foundation Projects, "About DPDK," https://www.dpdk.org/about/, Accessed Feb. 18, 2022, 3 pages.

Y. Le et al., "UNO: Unifying Host and Smart NIC Offload for Flexible Packet Processing," Proceedings of the 2017 Symposium on Cloud Computing, Sep. 24-27, 2017, 14 pages.

Wikipedia, "Zombie (computing)" https://en.wikipedia.org/wiki/Zombie_(computing)#:~:text=In%20computing%2C%20a%20zombie%20is,remote%20direction%20of%20the%20hacker, Dec. 20, 2021, 3 pages.

Wikipedia, "Computing," https://en.wikipedia.org/wiki/Computing, Oct. 23, 2021, 16 pages.

Wikipedia, "Computer Security," https://en.wikipedia.org/wiki/Computer_security, Nov. 22, 2021, 51 pages.

Wikipedia, "Security Hacker," https://en.wikipedia.org/wiki/Security_hacker, Oct. 7, 2021, 16 pages.

Wikipedia, "Computer Virus," https://en.wikipedia.org/wiki/Computer_virus, Nov. 22, 2021, 22 pages.

Wikipedia, "Computer Worm," https://en.wikipedia.org/wiki/Computer_worm, Nov. 15, 2021, 7 pages.

Wikipedia, "Trojan Horse (computing)" https://en.wikipedia.org/wiki/Trojan_horse_(computing), Nov. 13, 2021, 6 pages.

Wikipedia, "Botnet," https://en.wikipedia.org/wiki/Botnet, Nov. 20, 2021, 15 pages.

Wikipedia, "Email Spam," https://en.wikipedia.org/wiki/Email_spam, Nov. 15, 2021, 15 pages.

Wikipedia, "Denial-of-service Attack," https://en.wikipedia.org/wiki/Denial-of-service_attack, Nov. 18, 2021, 28 pages.

* cited by examiner

PHYSICAL HARDWARE CONTROLLER FOR PROVISIONING SECURITY SERVICES ON PROCESSING DEVICES

FIELD

The field relates generally to information processing, and more particularly to management of information processing systems.

BACKGROUND

Various client devices, such as laptops, desktops, etc., are installed with an operating system, referred to as a host operating system. Various software-defined services are controlled by the host operating system of such client devices. A host operating system, for example, may include hundreds of different services which collaborate with one another to run software on the hardware of a given client device. Each service typically has its own goals and characteristics, and may be used for performing different types of operations that utilize different types and amounts of hardware resources of client devices. Some services are processor-intensive (e.g., consuming significant amounts of processor or compute resources), while other services may be memory-intensive (e.g., consuming significant amounts of memory) or network-intensive (e.g., consuming significant amounts of network resources). The performance and user experience on a client device may be greatly affected by the particular numbers and types of services that run on that client device.

SUMMARY

Illustrative embodiments of the present disclosure provide techniques for provisioning security services on a processing device utilizing a physical hardware controller coupled to the processing device.

In one embodiment, an apparatus comprises a first processing device. The first processing device comprises a physical hardware controller, and is configured for coupling with a second processing device. The first processing device is configured to perform steps of identifying one or more remote security service instances attached to the second processing device and initiating, at the first processing device, one or more network emulation modules for the one or more remote security service instances attached to the second processing device, the one or more network emulation modules emulating one or more physical network interface devices configured for attachment to the second processing device. The first processing device is also configured to perform the step of provisioning the one or more remote security service instances to the second processing device by utilizing hardware resources of the physical hardware controller to analyze network traffic associated with the second processing device, to modify at least a portion of the network traffic based at least in part on the analysis, and to provide the modified network traffic to the second processing device via the emulated one or more physical network interface devices.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
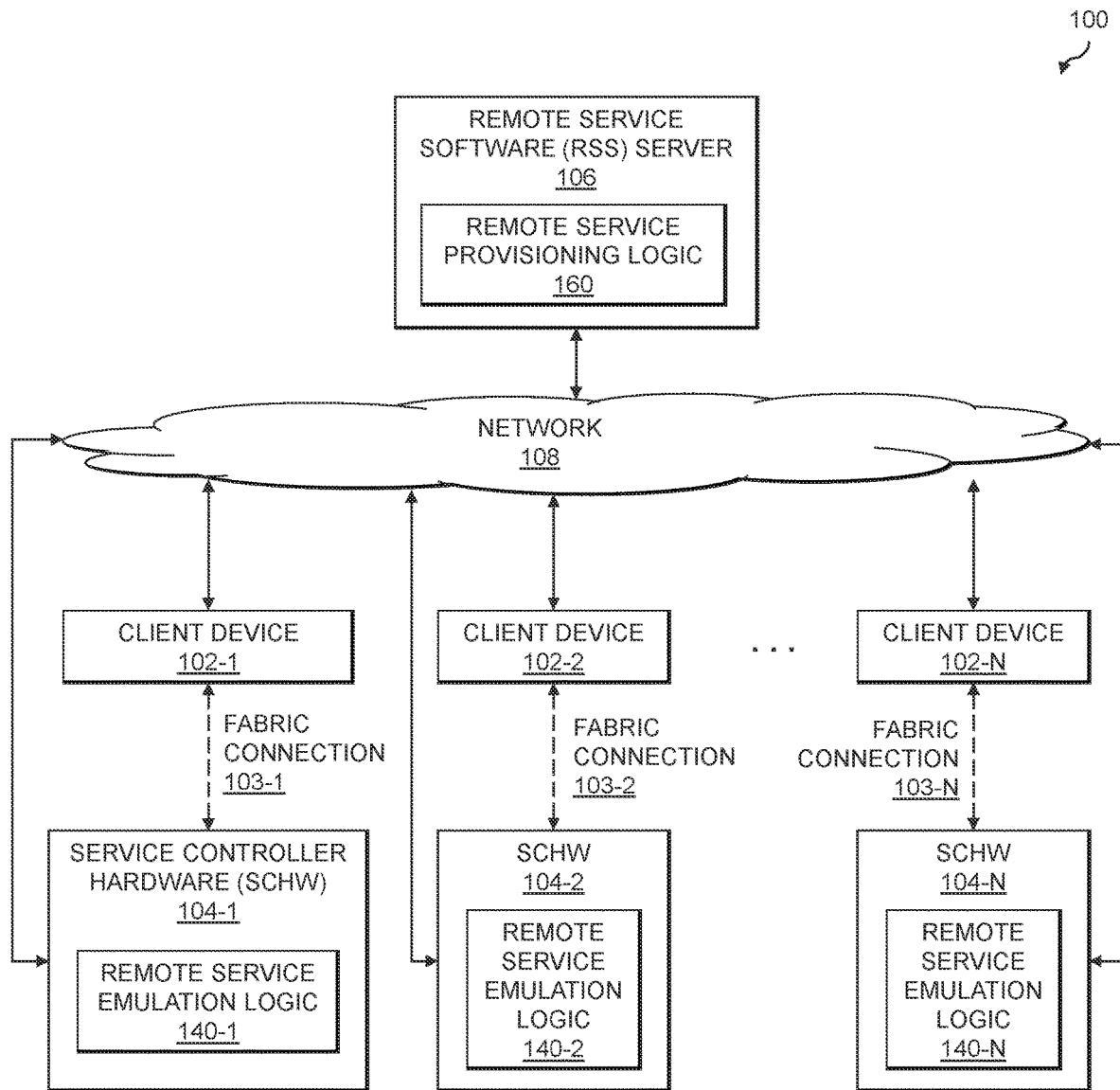
FIG. 1 is a block diagram of an information processing system configured for provisioning services on client devices using physical hardware controllers attached thereto in an illustrative embodiment.

FIG. 1 shows an information processing system 100 configured in accordance with an illustrative embodiment for provisioning services on processing devices using physical hardware controllers attached thereto. The information processing system 100 comprises a set of client devices 102-1, 102-2, . . . 102-N (collectively, client devices 102) which communicate with respective physical hardware controllers referred to as service controller hardware (SCHW) 104-1, 104-2, . . . 104-N (collectively, SCHW 104) via respective fabric connections 103-1, 103-2, . . . 103-N (collectively, fabric connections 103). The fabric connections 103 may comprise Universal Serial Bus (USB), Peripheral Component Interconnect Express (PCIe), or other types of high bandwidth and no (or minimal) latency fabrics. The client devices 102 and SCHW 104 are also configured for communication with a remote service software (RSS) server 106 via a network 108. Although in the FIG. 1 embodiment each of the client devices 102 and SCHW 104 have separate connections to the network 108, in other embodiments one or more of the SCHW 104 (e.g., SCHW 104-1) may connect to the network via its associated one of the client devices 102 (e.g., client device 102-1).

The client devices 102, may comprise, for example, physical computing devices such as Internet of Things (IoT) devices, mobile telephones, laptop computers, tablet computers, desktop computers or other types of devices, in any combination. Such devices are examples of what are more generally referred to herein as "processing devices." Some of these processing devices are also generally referred to herein as "computers." The client devices 102 may also or alternately comprise virtualized computing resources, such as virtual machines (VMs), containers, etc.

The client devices 102 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The SCHW 104 may comprise "miniature" computers or mini-computers. A mini-computer may be implemented as a single-board computer (SBC), a computer-on-module (COM) or system on a module (SOM), an embedded computer system, a system on chip (SoC), a system in a package (SiP), an integrated circuit, a hardware accelerator, etc. The SCHW 104 illustratively have their own process and memory space, and are capable of executing an operating system (OS) in a standalone fashion (e.g., separate from a host OS that runs or executes on the client devices 102).

The SCHW 104 may take on various form factors. In some embodiments, the SCHW 104 are implemented as embedded components of the client devices 102. In other embodiments, the SCHW 104 are implemented as external pluggable devices. In still other embodiments, some of the client devices 102 may be configured with embedded SCHW 104 while other client devices 102 are connected to external pluggable SCHW 104. It should also be noted that in some embodiments, one or more of the client devices 102 may be associated with multiple instances of SCHW. For example, a given client device may have both an embedded SCHW component and be connected to an external pluggable SCHW, or may have multiple instances of one or both of embedded SCHW and an external pluggable SCHW.

The RSS server 106 may be implemented as a standalone server, a set of servers or other types of systems, including but not limited to an edge computing site, cloud infrastructure comprising one or more clouds (e.g., one or more public clouds, one or more private clouds, one or more hybrid clouds, combinations thereof, etc.).

The network 108 may be implemented using multiple networks of different types. For example, the network 108 may comprise a portion of a global computer network such as the Internet, although other types of networks can be part of the network 108 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 108 in some embodiments therefore comprises combinations of multiple different types of networks each comprising processing devices configured to communicate using Internet Protocol (IP) or other related communication protocols.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Although not explicitly shown in FIG. 1, one or more input-output devices such as keyboards, displays or other types of input-output devices may be used to support one or more user interfaces to the client devices 102, the SCHW 104 and the RSS server 106, as well as to support communication between the client devices 102, the SCHW 104, the RSS server 106 and other related systems and devices not explicitly shown.

The SCHW 104 and the RSS server 106 in the FIG. 1 embodiment are assumed to be implemented using at least one processing device. Each such processing device generally comprises at least one processor and an associated memory, and implements one or more functional modules for controlling certain features of the SCHW 104 and the RSS server 106. In the FIG. 1 embodiment, the SCHW 104-1, 104-2, . . . 104-N implement respective instances of remote service emulation logic 140-1, 140-2, . . . 140-N (collectively, remote service emulation logic 140) which coordinate with remote service provisioning logic 160 on the RSS server 106 to provision services for the client devices 102. As will be described in further detail below, various different types of services may be provisioned utilizing the remote service emulation logic 140 and remote service provisioning logic 160, including but not limited to storage services, multimedia services, security or network monitoring services, etc.

At least portions of the functionality of the remote service emulation logic 140 and the remote service provisioning logic 160 may be implemented at least in part in the form of software that is stored in memory and executed by a processor.

The client devices 102, SCHW 104 and RSS server 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The client devices 102, SCHW 104 and RSS server 106 (or one or more components thereof such as the remote service emulation logic 140 and the remote service provisioning logic 160) may be implemented on respective distinct processing platforms, although numerous other arrangements are possible. For example, in some embodiments at least portions of one or more of the client devices 102 and one or more of the SCHW 104 are implemented on the same processing platform. Further, the RSS server 106 can be implemented at least in part within at least one processing platform that implements at least a subset of the client devices 102 and/or the SCHW 104.

The client devices 102, SCHW 104 and/or RSS server 106 in some embodiments may be implemented as part of a cloud-based system. The client devices 102, SCHW 104 and RSS server 106 can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks including network 108, the fabric connections 103, etc.

The term "processing platform" as used herein is intended to be broadly construed so as to encompass, by way of illustration and without limitation, multiple sets of processing devices and one or more associated storage systems that are configured to communicate over one or more networks. For example, distributed implementations of the client devices 102, SCHW 104 and RSS server 106 are possible, in which certain ones of the client devices 102 and their associated SCHW 104 reside in one data center in a first geographic location while other ones of the client devices 102 and their associated SCHW 104 reside in at least a second data center in at least a second geographic location that is potentially remote from the first geographic location. The RSS server 106 may be implemented at least in part in the first geographic location, the second geographic location, and one or more other geographic locations. Thus, it is possible in some implementations of the system 100 for different ones of the client devices 102, SCHW 104 and RSS server 106 to reside in different geographic locations. Numerous other distributed implementations of the client devices 102, SCHW 104 and RSS server 106 are possible.

Additional examples of processing platforms utilized to implement portions of the system 100 in illustrative embodiments will be described in more detail below in conjunction with FIGS. 14 and 15.

It is to be understood that the particular set of elements shown in FIG. 1 for provisioning services on the client devices 102 utilizing SCHW 104 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for provisioning services on client devices using physical hardware controllers attached thereto will now be described in more detail with reference to the flow diagram of FIG. 2. It is to be understood that this particular process is only an example, and that additional or alternative processes for provisioning services on client devices using physical hardware controllers attached thereto can be carried out in other embodiments.

In this embodiment, the process includes steps 200 through 206. These steps are assumed to be performed by the SCHW 104 and RSS server 106 utilizing the remote service emulation logic 140 and remote service provisioning logic 160. The process begins with step 200, receiving, at SCHW (e.g., SCHW 104-1) from a host OS of a client device (e.g., client device 102-1), a discovery request. The SCHW is configured for coupling with the client device, such as over one or more fabric connections (e.g., fabric connection 103-1). The fabric connections may comprise at least one of a USB fabric connection and a PCIe fabric connection. The SCHW may be internally coupled to the client device as an embedded component of the client device, or may be externally coupled to the client device as an external pluggable device. The SCHW has a process and memory space executing a standalone OS separate from the host OS of the client device. The SCHW may comprise at least one of an SBC, COM, SOM, embedded computer system, SoC, SiP, integrated circuit and hardware accelerator.

In step 202, one or more emulation modules running on the SCHW are identified, the one or more emulation modules emulating one or more physical hardware devices configured for attachment to the client device. In some embodiments, the one or more emulation modules are implemented utilizing at least one of software containers, VMs, and microservices. In step 204, a response to the discovery request is provided from the SCHW to the client device. The response indicates a set of capabilities associated with the emulated one or more physical hardware devices. In step 206, one or more services are provisioned to the client device from the SCHW. Such provisioning includes performing processing of the one or more services utilizing hardware resources of the SCHW, and providing results of such processing to the client device via the emulated one or more physical hardware devices. At least a portion of the processing of the one or more services may be offloaded from the SCHW to a computing site (e.g., an edge computing site, a cloud computing platform, etc.) remote from the SCHW and the client device.

In some embodiments, the SCHW comprises a physical shut-off switch configured to turn off the SCHW independent of the client device. The SCHW may be further configured to detect one or more designated patterns of activity of the one or more emulation modules and, responsive to detecting the one or more designated patterns of activity, to provide a notification to the client device recommending actuation of the physical shut-off switch of the SCHW. The SCHW may also or alternatively be configured, responsive to detecting a first one of the one or more designated patterns of activity, to provide the notification to the client device recommending actuation of the physical shut-off switch of the SCHW and, responsive to detecting a second one of the one or more designated patterns of activity, to initiate an automatic shut-off of the SCHW.

Figure 2:
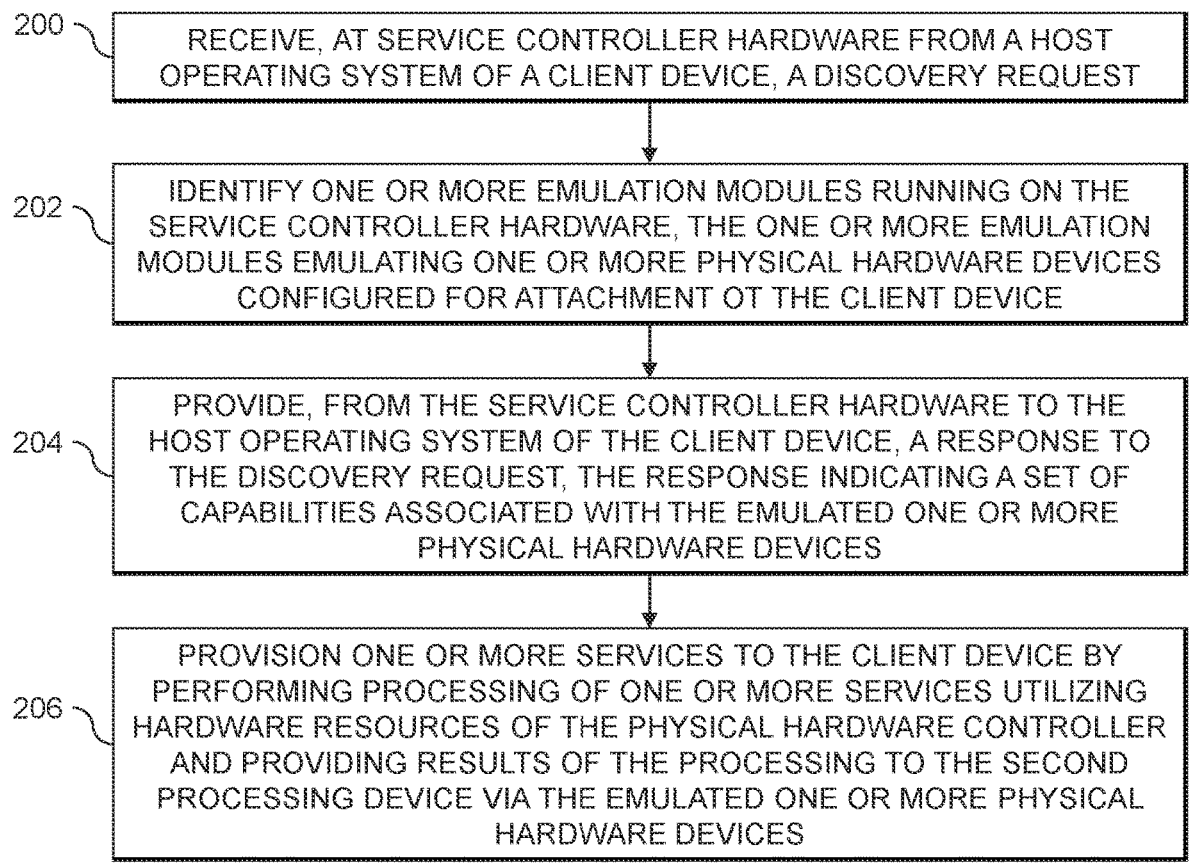
FIG. 2 is a flow diagram of an exemplary process for provisioning services on client devices using physical hardware controllers attached thereto in an illustrative embodiment.

The FIG. 2 process may further include the SCHW obtaining a device identifier of the client device (e.g., that it is connected to), utilizing the obtained device identifier of the second processing device to determine the one or more services attached to the client device, and executing the one or more emulation modules used for provisioning of the one or more services attached to the client device. The one or more services may be determined using an RSS server (e.g., RSS server 106), the one or more emulation modules being downloaded to the SCHW from the RSS server. At least one of the one or more services attached to the client device may be attached to one or more additional client devices, the client device and the one or more additional client devices comprising respective client devices associated with at least one of: a same user; and two or more users in a same level of an organizational hierarchy of an enterprise.

Illustrative embodiments provide technical solutions for providing system-level services that appear to a host (e.g., a client device) as physically attached "hardware" (e.g., peripheral components that are internal to the client device or which are externally pluggable or otherwise physically attached thereto). The technical solutions described herein include hardware and software designs for enabling users to remotely provision and attach various software-defined system-level services on client devices. As noted above, the software-defined system-level services are configured to appear to the client devices as physically attached hardware through emulation. In this way, a host OS running on a client device can communicate with the emulated hardware (e.g., providing provisioned software-defined system-level services) using standard drivers of the host OS. Advantageously, the client device is enabled to utilize custom software-defined system-level services without requiring any additional custom software to be installed in or by the host OS (only the standard drivers of the host OS are required). Various types of software-defined system-level services may be provided using the technical solutions described herein, including but not limited to storage services, multimedia services, security or network services, etc.

Various client devices, such as laptops, desktops, etc., are installed with an operating system (e.g., a host OS), where software-defined services are controlled by the host OS. These services are varied, and may include services for network attached storage, rich multimedia services, etc. The host OS may include a large number of different services (e.g., hundreds of services), and such services collaborate with each other to run various software on the hardware of the client device. Not all services are the same, however, and each service may have its own goals and characteristics. Some of the services deal with input/output (I/O) requests, and often block or consume significant processing (e.g., central processing unit (CPU)) resources of the client device for that reason. In many client devices, the CPU (or other processor) is the most precious resource of the machine, and thus various hardware is designed to take best advantage of the CPU. With the CPU being blocked, the efficiency of hardware and the ultimate user experience of the client device is at risk. It should be noted that the critical or limiting resources of a client device are not limited solely to CPU or other processing resources. Other types of hardware resources, such as memory resources, storage resources, network resources, etc., may be limiting factors and play a role in the performance of applications or other software running on a client device.

The technical solutions described herein provide mechanisms for offloading system services of a client device to one or more additional, separate devices. The separate device is implemented as a locally attached controller, which may be an embedded component of the client device such as an internal peripheral component of the client device, an external pluggable device or peripheral component, etc. The offloaded services may be run directly on such separate devices, the separate devices may themselves offload the services to a remote computing site (e.g., an edge computing site, a cloud computing platform, etc.), or combinations thereof. The offloaded system services may include services with high resource consumption, with the additional separate devices being more efficient at processing such services so that resources can be freed up on the client device to contribute more efficiently to other services running on the client device (e.g., which may impact performance or account for user experience thereof).

The technical solutions described herein overcome various technical problems associated with conventional approaches. Such technical problems include that system-level services can consume significant resources on a host or client device. Various system-level services, including but not limited to multimedia services, network attached storage, etc., may consume significant amounts of resources including but not limited to compute cycles, memory space, etc. of a host or client device. As an example, the Data Plane Development Kit (DPDK) is an open-source framework that brings network packet processing from a system domain to a user domain to take advantage of multiple-core CPUs. DPDK, however, provides software that brings complexity to the host or client device on which it runs, due to the installation of and requirement for new components. Illustrative embodiments provide technical solutions that enable the resources consumed by such services to be offloaded, such that the host or client device does not need to provide extra resources for them.

Another technical problem with conventional approaches is that re-installation of a host OS on a client device will remove all system-level services (e.g., which are not bundled with the host OS installation). Re-installation of the host OS removes all the services that a user has installed on the OS, forcing the user to manually reinstall all services that are needed. Further, most software and services require some configuration before use. Re-installation of the host OS will discard configurations of existing services and software. In some cases, it can be very difficult and time-consuming to re-configure software and services following re-installation of the host OS, which discards the configurations of existing services. As an example, Network File System (NFS) is a network filesystem that needs to be configured with an IP address of the NFS server, a device or folder on the NFS server, a username and password, a version of NFS, a target format of the filesystem, a target mount path, a target permission type, etc. While it may not be very difficult to configure (or reconfigure) an NFS client, remembering to do so presents a technical problem since a user may forget that such configuration needs to be performed on re-installation of the host OS (e.g., as such configuration only needs to be done once). In other words, users would notice the absence of NFS-mounted folders only when they attempt to use them, at which point the user would need to find the appropriate configuration details and manually configure the NFS client. This leads to another technical problem of keeping track of the configuration itself. A user would need to find a place to store the configuration information, and may further need to consider the security of the configuration information if it contains sensitive credentials.

Further, there may be various technical problems associated with using services on a new machine or device, as this requires configuration of services on that new device. With the advent of advanced communication networks and protocols, such as 5G and edge computing, new use case scenarios are contemplated. Consider, as an example, that various facilities (e.g., coffee shops, offices, airports, etc.) may provide multimedia terminals or devices for use. Thus, a user would not necessarily need to bring their own device (e.g., a laptop) to work in a new facility. Configuring such multimedia terminals or devices in different facilities to bridge desired services thereto (e.g., from a user's "home" laptop or other device) may require significant manual effort, particularly as the user would need to do so repeatedly at multiple facilities or locations.

Conventional approaches also suffer from technical problems in that it is difficult to manage and control services that run on multiple host or client devices, with hardware configuration (e.g., size of storage) being particularly difficult. Typically, such management requires remote log-in. For example, if an NFS server is upgraded with a new configuration, then all clients of that NFS server would need to be reconfigured (e.g., as the mounting parameters would be different). Thus, an operator (e.g., IT support staff) or each user of the devices running the NFS clients would need to login to the devices and re-mount remote folders with the updated configuration. For an NFS server with thousands of clients, for example, this would require significant manual effort. The technical solutions described herein enable a control plane across multiple devices which can significantly reduce such manual effort.

Additional technical problems include that services affiliation to certain types of OSes makes it hard for a user to change platforms. For example, it is common that a legacy service may be developed for only one OS platform (e.g., Windows, Linux, etc.). In some cases, even the version of a given platform would matter (e.g., a service may only function correctly on a particular version of an OS platform, such as a particular version of a Linux distribution, etc.). This can potentially delay or even block upgrading and security updates for a current platform.

The technical solutions described herein provide mechanisms for embedding or attaching physical SCHW in client devices, and further provide a design for Service Controller Software (SCS) running within the SCHW as well as RSS which may run remote from the client device in which the SCHW is embedded or attached. In some embodiments, the RSS runs on a remote computing site, such as an edge computing site, a cloud computing platform, etc.

The SCHW can be connected to a client device (also referred to as a host device or simply a host) via different fabrics. Such fabrics may include, but are not limited to, USB, PCIe and other high bandwidth and no or minimal latency fabrics. Based on the fabric that is utilized, a host OS driver for the SCHW will be implemented differently. In the description below, it is assumed that the fabric connecting the SCHW to the client device is USB. It should be appreciated, however, that various other fabrics may be utilized including but not limited to PCIe embedded SoC with a modified implementation. Such implementation differences and details will be called out and explained in the description below where necessary.

In some embodiments, a SCHW is implemented utilizing Smart Network Interface Card (SmartNIC) or other SoC technology. SmartNIC and SoC technology provide the SCHW with its own process and memory space, making the SCHW a mini-computer that is capable of executing its own OS in a standalone fashion. Although limited by computation power and storage, SmartNIC and other SoC devices can be suitably modified to act as a smart controller that is remotely orchestrated from a control plane (e.g., implemented on a cloud computing platform, an edge computing site or other standalone server, etc.) to provide SCHW functionalities. In some cases, the SCHW has a separate Network Interface Card (NIC). In other cases, the SCHW can share the NIC with the host OS (e.g., with SmartNIC technology).

Figure 3:
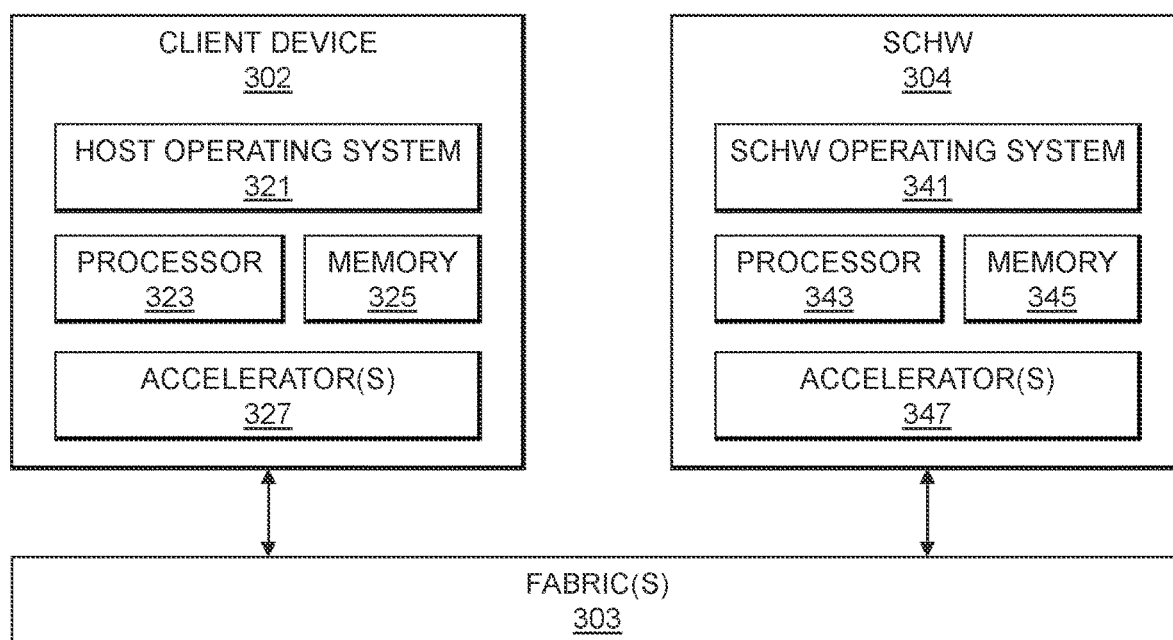
FIG. 3 shows a fabric connection between a client device and service controller hardware in an illustrative embodiment.

FIG. 3 illustrates connection between a client device 302 and SCHW 304. As shown, the client device 302 and SCHW 304 are connected via one or more fabrics 303 (e.g., USB, PCIe, etc.). The client device 302 has a host OS 321, as well as one or more processors 323, one or more memories 325, and one or more accelerators 327. Similarly, the SCHW 304 has a SCHW OS 341, one or more processors 343, one or more memories 345, and one or more accelerators 347. Although the client device 302 and SCHW 304 are connected through a physical fabric 303, the client device 302 and SCHW 304 cannot communicate with one another without use of SCS implemented on the SCHW 304.

The SCS running on SCHW 304 includes the SCHW OS 341. Depending on the architecture of the SCHW 304 (e.g., ARM, x86, etc.), the implementation of the SCHW OS 341 would be different. In the description below, it is assumed that the SCHW OS 341 is a distribution of Linux, but this is not a requirement. The SCHW 304 will emulate as a physical device that the host OS 321 can consume by using standard drivers. With this design, no additional software needs to be installed on the host OS 321. All remote system-level services will appear as physical (e.g., hardware) functions to the host OS 321.

Figure 4:
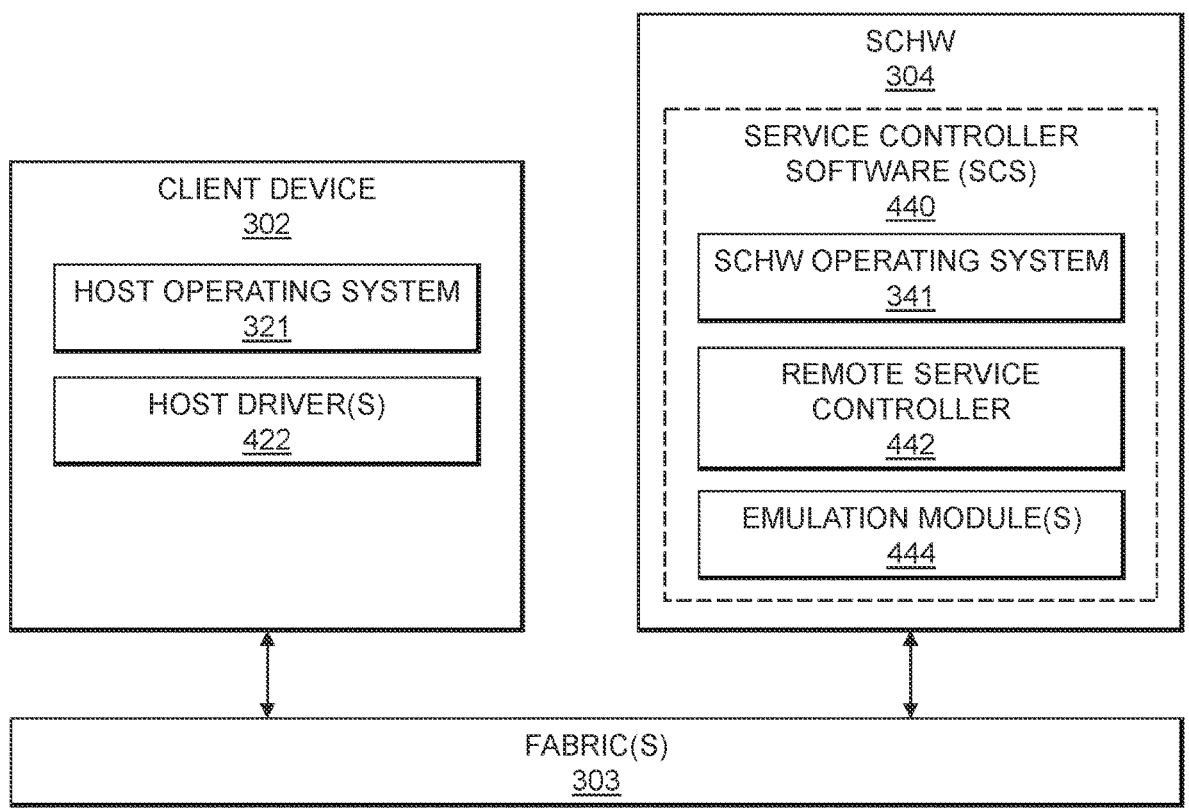
FIG. 4 shows communication between a client device and service controller software on service controller hardware in an illustrative embodiment.

FIG. 4 illustrates communication between the client device 302 and SCHW 304 as enabled via SCS 440, which includes the SCHW OS 341, a Remote Service Controller (RSC) 442, and one or more emulation modules 444. The SCHW OS 341 is capable of running different processes, like any other OS, as well as containers (e.g., with cgroups functionality) and VMs (e.g., with hypervisor functionality). In some embodiments, the SCHW OS 341 is locked down so that no user (e.g., of the client device 302) is able to log in. This prevents users (and potentially intruders or other malicious actors) from manipulating the information and processes stored on the SCHW 304. The software executing on the SCHW OS 341 may be orchestrated remotely.

Within the SCHW OS 341, software runs to orchestrate different ones of the emulation modules 444. Depending on the services selected by a user remotely (e.g., as described in further detail below with respect to FIG. 5), the RSC 442 will download corresponding software for execution in SCS 440. When the host OS 321 attempts to discover what SCHW 304 is capable of, it will send a signal expecting the SCHW 304 "device" to answer back with its capabilities in a format defined by the standards of the fabrics 303 utilized for interconnecting the client device 302 and the SCHW 304. Both USB and PCIe fabrics, for example, have established standards of communication. When the signal is received by the SCHW 304, depending on which emulation modules 444 are running, it will respond differently. Based on the response received from the SCHW 304, the host OS 321 will register the SCHW 304 as correspondent physical devices and utilize host drivers 422 for communicating with the emulated physical devices. For example, if the host OS 321 is Linux, it will create new files, representing the physical devices emulated via the emulation modules 444, inside the "/dev" folder. The major difference from other files in the "/dev" folder representing conventional physical devices, is that commands from the host OS 321 will be sent to the emulation modules 444 instead of physically attached devices. As an example, one of the emulation modules 444 may emulate mass storage utilizing USB On-The-Go (OTG) standards similar to how an Android phone appears as USB mass storage when plugged into a personal computer (PC).

The orchestration of the emulation modules 444 may be achieved via different mechanisms, including but not limited to processes, containers, VMs, microservices, etc. Microservices design allows for each of the emulation modules 444 to be orchestrated independently. Lifecycle and version updates for each of the emulation modules 444 would then not interfere with one another.

Figure 5:
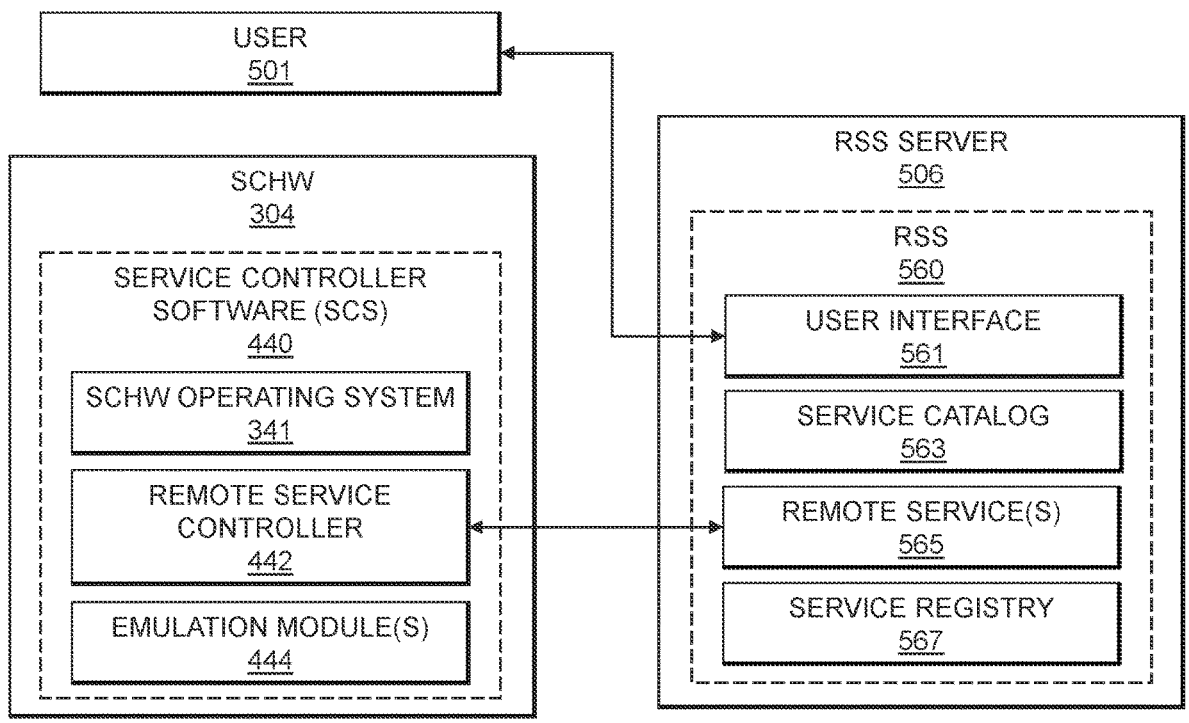
FIG. 5 shows a control plane for remote software services enabled utilizing service controller software of service controller hardware in an illustrative embodiment.
Figure 6:
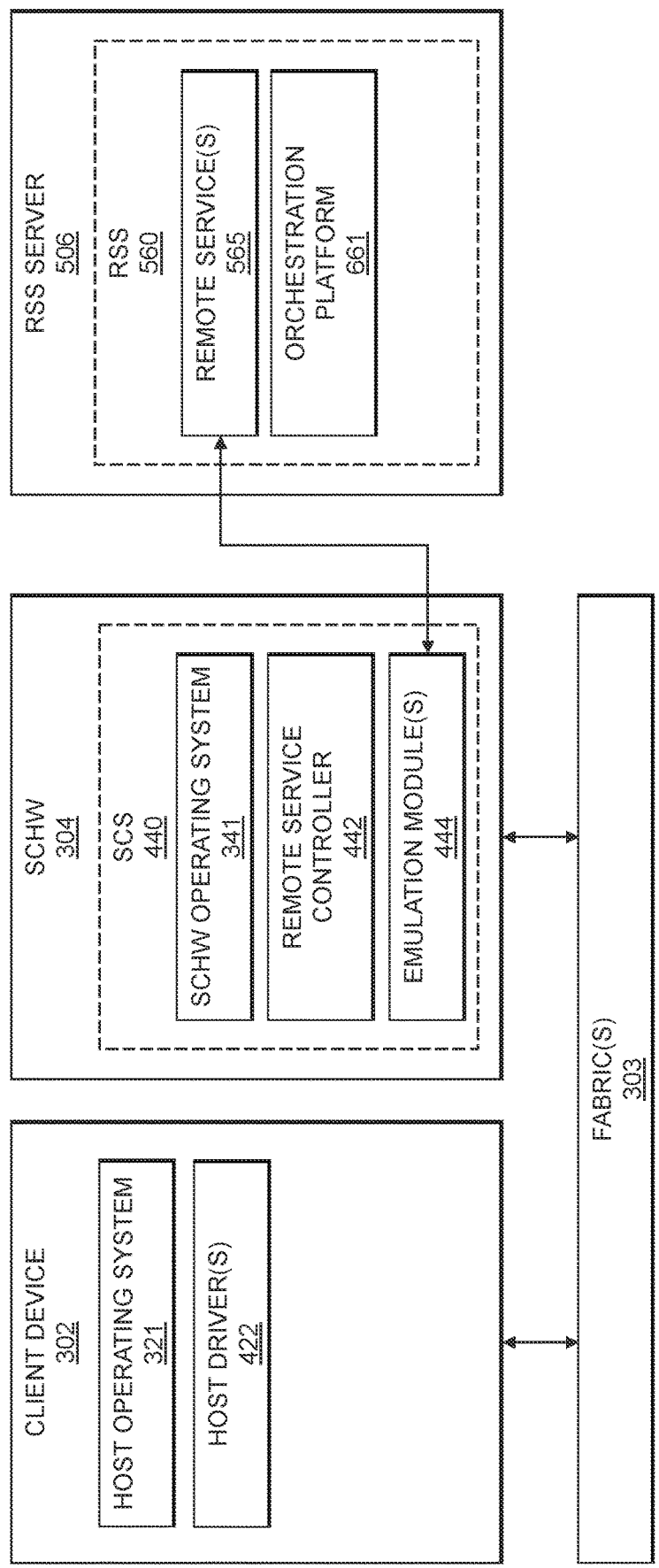
FIG. 6 shows a data plane between remote software services and service controller hardware in an illustrative embodiment.

The SCS 440 responds to the host OS 321 on the client device 302 with its capabilities (e.g., of the "hardware" emulated by the emulation modules 444). In order to perform its functionality, the SCS 440 will gain remote access to RSS 560 operating on an RSS server 506 as illustrated in FIGS. 5 and 6. The RSS 560 implemented by the RSS server 506 provides both control plane and data plane software functionalities, with FIG. 5 illustrating the control plane functionalities and FIG. 6 illustrating the data plane functionalities.

The control plane functionalities of the RSS 560 include providing a user interface 561 that enables a user 501 to create a profile and log in to provision services, selected from a service catalog 563, as remote services 565 attached to their client devices (e.g., the client device 302 via the RSC 442 of SCS 440 running on SCHW 304 attached thereto via fabrics 303). The service catalog 563 provides a catalog of registered services, while the service registry 567 stores associated emulation modules. The profile enables the user 501 to quickly and easily retrieve their settings if they change devices in the future. The SCHW 304 can also be controlled remotely by the RSS 560 to manage lifecycle and version updates of emulation modules 444 executing within the SCHW 304.

As shown in FIG. 6, the emulation modules 444 connect with the RSS 560 remotely and establish a data path via orchestration platform 661, thereby bridging the client device 302, the SCHW 304 and the RSS 560 operating on the RSS server 506. The orchestration platform 661 may be used for provisioning remote services 565 to the emulation modules 444. When the host OS 321 sends a request to one of the emulation modules 444, the remote services 565 that are related to that one of the emulation modules 444 will be scheduled to run by the orchestration platform 661 of the RSS 560.

If the SCHW 304 loses access to the RSS 560, this can be handled in several ways depending on the implementation. For example, some embodiments may utilize a caching mechanism that enables recently and/or commonly completed actions to continue if the SCHW 304 goes offline (e.g., loses connectivity to the RSS server 506 implementing RSS 560). In other embodiments, a machine learning (ML) model may be implemented that learns from common types of decisions and continues those until connectivity is restored. The user 501 can also preconfigure settings for when connectivity is lost.

Functionality of the SCS 440 and RSS 560 will now be described in further detail. In order for any service to show up on RSS 560, service providers would first register their services in the service catalog 563, along with associated emulation modules in the service registry 567. The service catalog 563 may utilize a predefined application programming interface (API) so that developers can control how their services would appear to the users with service descriptions. In some embodiments, the service catalog 563 implements an Open Service Broker API for this purpose. The developer would also need to upload their remote services (e.g., as remote services 565) and associated emulation modules (e.g., in service registry 567). The remote services 565 are the core components fulfilling some desired functionality (e.g., business value), while the associated emulation modules 444 translate host OS commands (e.g., from host OS 321) into requests that the remote services 565 can handle. In some embodiments, containerization or virtualization technologies are utilized to standardize the execution environment for the emulation modules 444 and remote services 565. To summarize, a developer would need to upload a service description (e.g., that is made part of the service catalog 563), a remote service (e.g., provided as one of remote services 565), and an emulation module (e.g., that is stored in the service registry 567). Service providers can repeat such steps for each version available for any of the three artifacts (e.g., service description, remote service and emulation module).

Registration of client devices, such as client device 302, will now be described. When a user obtains a new client device (e.g., a laptop, desktop, etc.), a unique device identifier is created to identify that client device. In some embodiments, the unique device identifier is in a universally unique identifier (UUID) format. The unique device identifier enables the user to register the new client device through the user interface 561 of the RSS 560. It should be noted that a user may have multiple client devices registered with the RSS 560. The client devices registered with the RSS 560 may be organized into groups and hierarchies, such as in an enterprise organizational structure, for ease of management.

Figure 7:
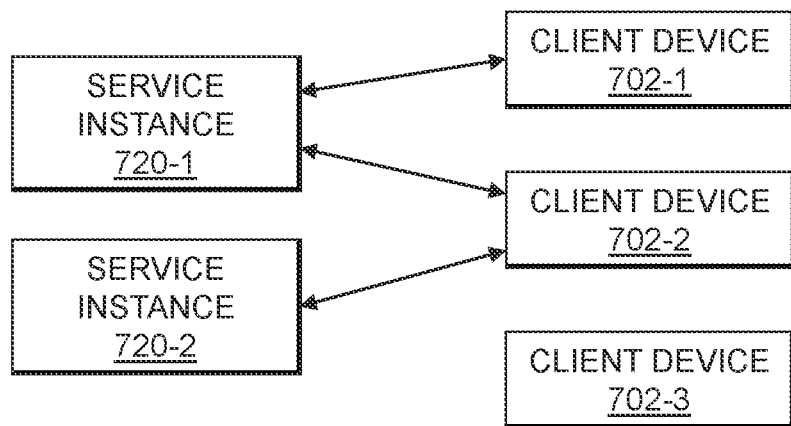
FIG. 7 shows service provisioning and attachment to different client devices in an illustrative embodiment.

Service provisioning and attachment will now be described. The user 501 can log into RSS 560 and provision service instances from the user interface 561. Once a service instance is provisioned, the user 501 can then attach that service to one or more of their client devices (e.g., attaching remote services 565 to the RSC 442 of the SCS 440 running on the SCHW 304). Some services can only be attached to one client device at a time, while other services can be attached to multiple client devices concurrently. In a similar manner, the remote services 565 can also be detached and deprovisioned (e.g., from the RSC 442 of the SCS 440 running on SCHW 304). FIG. 7 illustrates attachment of service instances 720-1 and 720-2 to a set of client devices 702-1, 702-2 and 702-3. In this example, the service instance 720-1 is attached to client devices 702-1 and 702-2, and the service instance 720-2 is attached to the client device 702-2. Client device 702-3 is an example of a client device that is registered with RSS 560 but which has no service instances currently attached thereto. As described elsewhere herein, service instances may be attached to and detached from different client devices as desired. Such attachment and detachment of service instances to or from client devices may occur, for example, in conjunction with moving a particular service instance between two client devices registered to a same user, adding new service instances to one or more client devices, removing existing service instances from one or more client devices, and in numerous other scenarios.

Installation of emulation modules will now be described. As the user 501 turns on their client devices (e.g., client device 302) any associated SCHW devices (e.g., SCHW 304) connected thereto may also be turned on. After the SCS 440 is booted on the SCHW 304, for example, the RSC 442 will connect with RSS 560 (e.g., utilizing the unique device identifier of the client device 302) to determine if any remote services 565 should be attached. If a new service instance is attached, the RSC 442 will download the corresponding emulation module from the service registry 567. That emulation module would then be executed as one of the emulation modules 444 on the SCS 440 of SCHW 304. When the user 501 detaches and deprovisions a service instance, the associated one of the emulation modules 444 would be shut down and deleted from SCS 440 in a similar fashion.

When the client device 302 boots up or turns on, the host OS 321 will obtain device information from the SCHW 304 as described above to determine which driver or drivers it can use to communicate with and utilize the SCHW 304. Based on the emulation modules 444 running on the SCHW 304, the host OS 321 will "think" that the SCHW 304 is one or more physically attached devices that the emulation modules 444 are emulating. The host OS 321 will then utilize standard drivers for communication with such physically attached devices being emulated by the emulation modules 444. The remote services 565 for the emulation modules 444 will also be orchestrated via the orchestration platform 661 where the RSS server 506 is running (e.g., at an edge computing site, a cloud computing environment, etc.). The host OS 321, as described above, communicates with the SCS 440 by standard drivers through the fabric 303. The corresponding emulation modules 444 running on the SCS 440 will process the signals, send corresponding requests to the remote services 565, and respond back to the host OS 321 with results from the remote services 565. It should be noted that this is not limited to a single round process—communication among the host OS 321, the emulation modules 444 and remote services 565 may involve multiple communication rounds that are processed continuously or as-needed to provide desired functionality.

In some embodiments, the SCHW 304 implements a physical switch that enables the SCHW 304 to be turned off (e.g., independent of the client device 302 it is attached to). While the SCHW 304 can provide many new capabilities, it also provides another runtime environment that is out of reach of the users of the client device 302. When users do not wish to utilize the capabilities of the SCHW 304, the physical switch may be actuated to turn off the SCHW 304. Actuation of the physical shut-off switch may notify the SCHW 304 to turn into a hibernation mode, or to turn off completely after draining or completing any pending execution. Where the SCHW 304 is implemented as an external device (e.g., outside of the housing of the client device 302), the SCHW 304 may be simply unplugged and thus does not require a physical switch that allows a user of the client device 302 to temporarily disable or shutdown the SCHW 304. In some embodiments, the RSC 442 of the SCS 440 is configured to detect the occurrence of unusual (e.g., suspicious or potentially malicious) activity patterns. On such detection, the RSC 442 may prompt or notify a user of the client device 302 that such activity patterns are occurring and indicate that the SCHW 304 should be physically shut down. The RSC 442 may alternatively be configured to automatically shut down the SCHW 304 on detecting such activity patterns. In some embodiments, the RSC 442 may choose whether to send a notification to the user of the client device 302 or automatically initiate shutdown of the SCHW 304 based on the particular type of activity pattern that is detected, based on determining a riskiness of the particular type of activity pattern that is detected, etc.

SCHW devices (e.g., SCHW 304) provide various technical solutions and advantages, including remote provisioning of system-level services for client devices (e.g., client device 302). The SCHW technology provides separate hardware with its own OS (e.g., the SCHW OS 341) that provides a service controller (e.g., RSC 442) enabling remote system-level services (e.g., remote services 565) for the client device it is connected to. SCHW can leverage SmartNIC and emulator technologies, enabling remote system-level services for client devices. Such remotely provisioned system-level services, selectable by users of the client devices (e.g., or an administrator or IT staff that manages devices on behalf of an enterprise), will appear as physical hardware functionalities to the host OS of a client device, and are supported by standard drivers of the host OS. Further, the remotely provisioned system-level services will persist throughout reinstallation of host OSes on client devices. Illustrative embodiments also provide for collaborative software orchestration across clients, edge computing sites and cloud computing sites for provisioning of remote system-level services to users in a collaborative manner. Based on user selection, the capabilities of the client devices will dynamically change and can be remotely managed by users.

The technical solutions described herein can also advantageously improve end-user experience, particularly for users of client devices with limited hardware resources, by offloading resource-intensive processes (e.g., I/O-heavy processes) from a client device to its attached SCHW (and potentially from the SCHW to a remote computing site, such as an edge computing site, a cloud computing platform, etc.). In a typical client device, the clock speed of the CPU is generally much faster than other components and it provides one of the most critical resources for the client device. Taking full advantage of CPU resources not only improves the user experience, but also increases the cost efficiency. Due to the different level of clock speed of the CPU as compared to other components (e.g., I/O devices, storage, network, etc.), the CPU of a client device will have to block itself to wait for the input from such other components. This can dramatically slow down the CPU. Also, in certain platforms the CPU needs to constantly engage itself in processing the data transferring from one location to another location. This could be done with other computational processing units with much lower cost. Being able to detect such processes and offload them from a client device to its attached SCHW would allow the CPU of the client device to focus on other processes that it is more efficient at.

The RSS (e.g., RSS 560) also provides various advantages through enabling a marketplace for services that can be presented as "hardware" to a host OS via emulation modules (e.g., emulation modules 444) running on SCS (e.g., SCS 440). The RSS enables services to be published by one user (or other entity) and consumed by others. Further, the RSS makes it easier for operators to manage services across a group of devices (e.g., a group of client devices associated with a same user, a group of client devices that are operated by or under the control of an enterprise, etc.).

As described above, the SCHW may also be provisioned with a physical switch or other shutoff mechanism that enables a user of its attached client device to disable use of the SCHW (e.g., when SCHW is not needed, in response to detecting abnormal, suspicious or potentially malicious activity, etc.). The user is thus able to choose when to switch the SCHW on and off. In some embodiments, the user may be prompted to actuate the SCHW switch to turn off the SCHW if certain types of activity are detected, the SCHW switch may be preconfigured to turn the SCHW off automatically if certain types of activity are detected, etc.

The SCHW also enables orchestration to continue if connections are lost. For example, services may continue to be offloaded to the SCHW from a client device even if connectivity with a remote controller (e.g., the RSS server) is lost. This may be achieved by preconfiguring settings, using insights from historical data, caching recent decisions, etc.

Through leveraging the SCHW technology described herein, an organization can provide differentiation for its client devices while also enabling additional revenue streams from cloud and edge services. The SCHW technology also empowers the organization to become a service broker by setting up the service catalog on the RSS server. As a further technical advantage, the SCHW technology provides a control point for an organization into the client devices that it manages, where this control point can advantageously persist regardless of the host OS installed on the client devices. This enables the organization to provide more differentiating software-defined services, including but not limited to dynamic storage, multimedia services, remote computational acceleration, etc.

Figure 8:
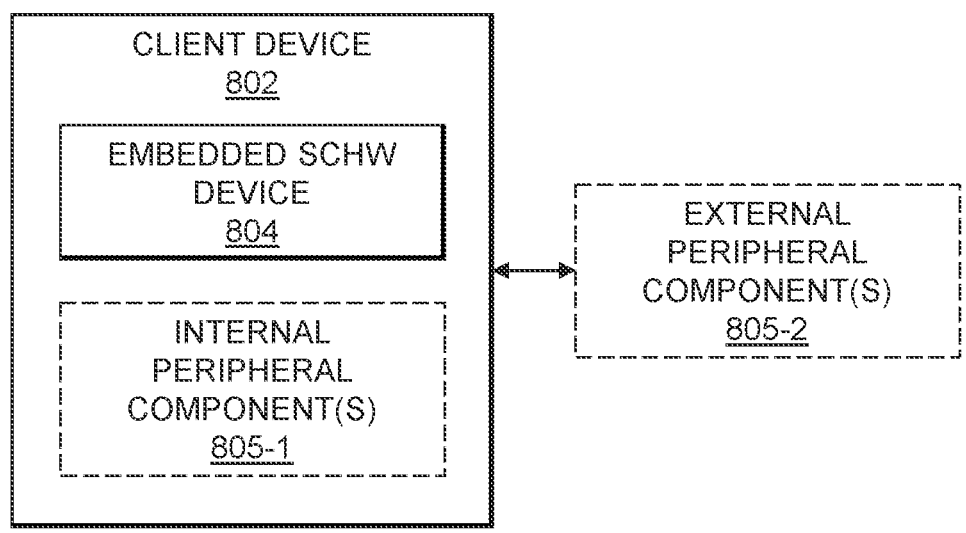
FIG. 8 shows a client device with an embedded service controller hardware device and peripheral components in an illustrative embodiment.

As noted above, an SCHW device may be implemented as either an embedded component within a client device, or as an external pluggable device. When implemented as an embedded component, the client device may be shipped to customers or other end-users with the SCHW device and SCS functionality pre-installed. The user can configure the services to be used on that client device via the RSS, and have services orchestrated thereto in an automated fashion. FIG. 8 shows an example of a client device 802 with an embedded SCHW device 804. The embedded SCHW device 804 may be connected to various internal peripheral components 805-1 of the client device 802 and/or external peripheral components 805-2 connected to the client device 802. The internal peripheral components 805-1 and external peripheral components 805-2 (collectively, peripheral components 805) may comprise various hardware, such as webcams or other cameras, microphones, mass storage devices, etc. It should also be noted that the embedded SCHW device 804 may be physically embodied as one of the internal peripheral components 805-1 (e.g., a PCIe component card, a USB device connected to an internal USB port of the client device 802, etc.). In some embodiments, some or all of the processing performed by or utilizing input from the peripheral components 805 is offloaded to the embedded SCHW device 804 (e.g., from a CPU or other processor of the client device 802 to a CPU or other processor of the embedded SCHW device 804, to a remote computing site such as an edge computing site, a cloud computing platform, etc.). As an example, one or more of the peripheral components 805 may comprise multimedia devices, with the embedded SCHW device 804 itself emulating as a hardware multimedia device to the client device 802 and performing various processing on audio and/or video that is captured by the multimedia device before is presented to the client device 802. Consider, as an example, audiovisual output of peripheral components 805, which may conventionally be processed in various ways (e.g., performing text-to-speech or audio translation, adding virtual backgrounds to video, combining video and/or audio sources, compressing audio and/or video, upscaling or transcoding audio and/or video, etc.) by the client device 802. Using the embedded SCHW device 804, such processing may be offloaded from the client device 802, freeing up resources of the client device 802 for other tasks.

Figure 9:
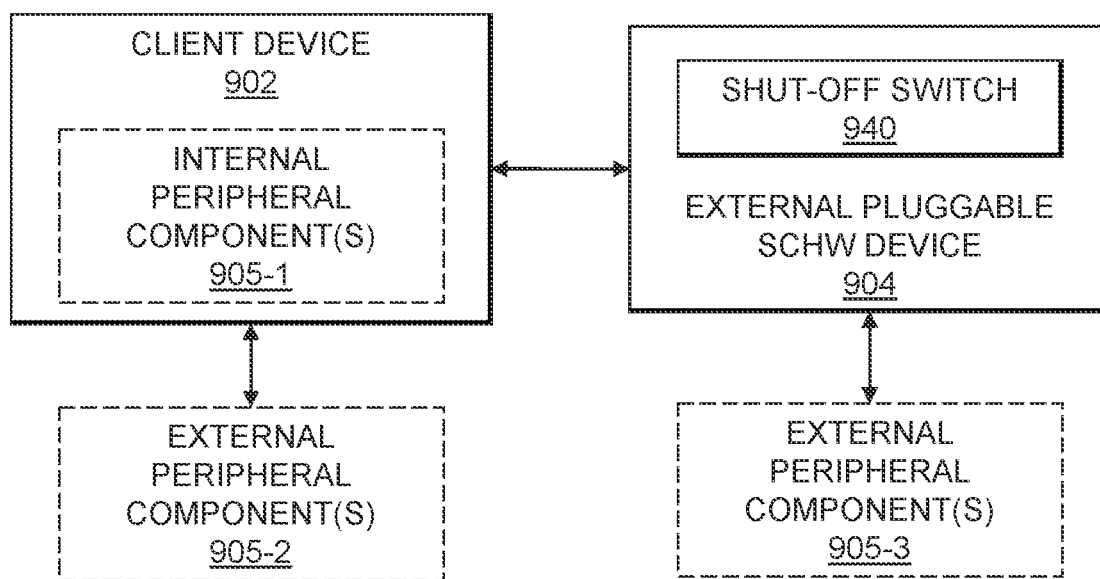
FIG. 9 shows a client device connected to an external pluggable service controller hardware device and peripheral components in an illustrative embodiment.

When implemented as an external pluggable device, the SCHW device may ship separately from client devices. The SCHW device can then be plugged into any client device (e.g., any computer) regardless of manufacturer, OS, etc. Once plugged in and configured, the SCHW device will provide the system-level services supported by the RSS server. FIG. 9 shows an example of a client device 902 connected to an external pluggable SCHW device 904. Here, peripheral components may be connected either directly to the client device 902 as internal peripheral components 905-1 or external peripheral components 905-2, or via the external pluggable SCHW device 904 as external peripheral components 905-3. The internal peripheral components 905-1, external peripheral components 905-2, and external peripheral components 905-3 are collectively referred to as peripheral components 905. The peripheral components 905 may be presented to the client device 902 as hardware "devices" via emulation modules running on the external pluggable SCHW device 904 in a manner similar to that described above with respect to FIG. 8 and elsewhere herein. The external pluggable SCHW device 904 may take on various form factors, such as using Raspberry Pi® hardware that is connected via a USB cable to a USB port of the client device 902 (e.g., a laptop). The USB cable connection between the external pluggable SCHW device 904 and the client device 902 may utilize USB-OTG. The external peripheral components 905-3 may include a USB microphone and USB webcam that are connected directly to USB ports of the external pluggable SCHW device 904. The external pluggable SCHW device 904 also includes a physical shut-off switch 940, configured to enable a user thereof to power on and off the external pluggable SCHW device 904 independent of the client device 902 that it is attached to. Although not explicitly shown in FIG. 8, the embedded SCHW device 804 may also comprise a physical shut-off switch.

In some embodiments, SCHW may be utilized for providing remote security services and other security enhancements for client devices. The remote security services, in some cases, may be implemented utilizing client, edge and cloud components as described in further detail below. The remote security services in some embodiments provide network traffic filtering utilizing access and block lists (also referred to as access control lists) that are available at SCHW, edge, cloud and possibly other components to ensure that uniform resource identifiers (URIs) accessed by a client device are safe prior to allowing the client device to establish a remote connection (e.g., over the Internet) to the URIs. SCHW provides a technical solution for offloading at least a portion of security services functionality (e.g., from the client device to an attached SCHW, and potentially from the SCHW to a remote computing site such as an RSS server which may be implemented at one or more edge computing sites, one or more cloud computing platforms, etc.). Such offloading advantageously frees up host resources of client devices for user processes (e.g., instead of the host resources being spent on system-level security services).

In some embodiments, a multi-level caching hierarchy (e.g., a tree-based caching topology) is utilized with multiple levels of caching of access control lists (e.g., at the SCHW and one or more remote computing sites, such as at edge computing sites or cloud computing platforms, where such edge computing sites or cloud computing platforms may implement an RSS server). Further, some embodiments leverage multiple different models for different types of network traffic pattern detection (e.g., for detecting different types of malicious or potentially malicious network traffic patterns), and utilize protocols for quickly updating access control lists (e.g., across multiple levels of a tree-based caching topology).

In client devices, most security solutions are software defined and are conventionally installed on top of OSes of the client devices. While such security solutions may be at least partially effective, they still suffer from various technical problems. For example, unintended user actions can lead to unexpected security vulnerabilities such as phishing incidents or attacks. Phishing incidents or attacks may result in client devices becoming computing "zombies" (e.g., computers connected to the Internet or another network that have been compromised by a hacker, virus, worm, malware, etc.), where such computing zombies can be used to perform malicious actions under remote direction. Such unintended user actions are a significant problem particularly in an enterprise setting, where malicious actions performed under remote direction on one client device can potentially compromise other client devices associated with the enterprise, and may even compromise enterprise-level infrastructure and data security.

In some situations, client devices are unable to connect to an enterprise virtual private network (VPN), and depend or rely on local Internet Service Providers (ISPs) for network routing. Thus, security solutions that are implemented in part using the enterprise VPN will have no or limited effectiveness in such situations.

Various types of client security issues can be addressed through remote security services that are provisioned to client devices utilizing attached SCHW. For example, remote security services may be used to address security issues associated with outgoing network traffic, incoming network traffic, combinations thereof, etc.

Most client-based security software is installed on a host OS of a client device. If the host OS becomes compromised, such client-based security software becomes less effective. Malware, for example, may work around client-based security software. Where the host OS is compromised, the client-based security software may be unable to remove the malware or other malicious software. Reinstalling, changing and/or upgrading a host OS will also completely remove any client-based security software, forcing users to manually reinstall them. If a user forgets to reinstall the client-based security software, security vulnerabilities may be introduced as the client device will no longer be under the protection of the client-based security software. Client-based security software is also typically OS-specific, and cannot work across different OS platforms.

With billions of different URIs on the Internet, it is difficult to store an access control list (e.g., listing URIs that are whitelisted and/or blacklisted) on a client device as the size of the access control list is too large. Further, even if an access control list is made available for lookup at a remote site (e.g., via cloud services), the amount of traffic thereto would potentially overwhelm data centers or other facilities if every (or at least some) of the client devices operating therein try to determine if each URI is safe to access utilizing lookups to the access control list maintained at the remote site.

Security is an ever-changing space, and new malicious or potentially malicious URIs are being generated and identified at a rapid rate. The speed at which malicious or potentially malicious URIs are updated within access control lists thus becomes extremely important. If access control list updates are too slow or infrequent, then many more users and associated client devices may fall victim to malicious or potentially malicious URIs. Conversely, increasing the speed and frequency of access control updates can potentially prevent many security incidents.

To prevent client devices from becoming zombie computers, security measures should be placed outside of the host OSes of the client devices, in case such host OSes become or are already compromised. The identification of malicious or potentially malicious network traffic patterns should thus be performed at or using a secured environment without interference from potentially compromised software that runs within the host OS of a client device. Further, remedial action should be taken once malicious or potentially malicious network traffic patterns are identified. Such remedial actions should similarly be executed by or using a secured environment that is outside the control of a host OS of a client device, so that malicious actors that have compromised the host OS of the client device cannot interfere with the remedial actions.

In some embodiments, SCHW is leveraged to provide security enhancements for client devices, utilizing client, edge and cloud components. The SCHW can provision security services to a client device, enabling that client device to utilize access control lists which may be stored or made available remotely, such as at one or more edge computing sites or one or more cloud computing platforms. Such access control lists may be utilized for determining whether URIs that the client device attempts to access are considered safe (e.g., not blocked or blacklisted in the access control list) prior to establishing remote Internet or other network connections with such URIs. Security functionality is advantageously offloaded from the client device to the SCHW (and potentially from the SCHW to one or more remote computing sites, such as an RSS server which may be implemented at least in part utilizing one or more edge computing sites and/or one or more cloud computing platforms). The client device can thus utilize more of its host resources for user processes rather than spending the host resources on system-level security processes. As described above and elsewhere herein, in some embodiments a tree-based caching topology is utilized with multiple levels of caching of an access control list or portions thereof. Security services provisioned via SCHW can also utilize different models for detection of malicious or potentially malicious network traffic patterns, as well as protocols for quickly updating access control lists (e.g., across different levels of the tree-based caching topology, including edge computing sites and the SCHW).

Figure 10:
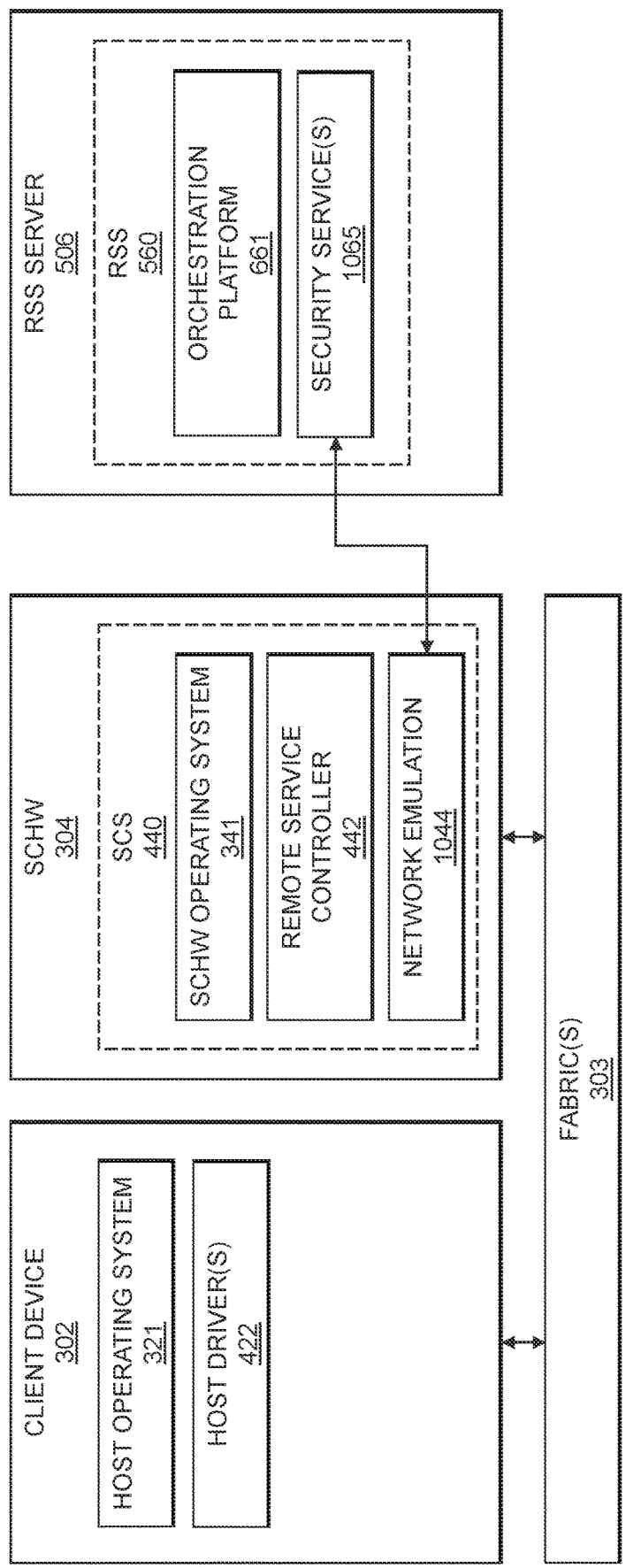
FIG. 10 shows a data plane between remote software services and service controller hardware for provisioning of security services on a client device in an illustrative embodiment.

SCHW, SCS and RSS components may be used to remotely provision and manage security services for client devices. FIG. 10 shows an architecture for provisioning remote security services, including client device 302, SCHW 304 and RSS server 506 as described above. The SCHW 304 running SCS 440 implements network emulation modules 1044 that provision remote security services 1065 running on the RSS 560 of RSS server 506 for the client device 302. In this example, the host OS 321 of the client device 302 utilizes its host drivers 422 (e.g., network interface card (NIC) drivers) to communicate with the network emulation modules 1044 through which the remote security services 1065 are provisioned.

Utilizing the user interface 561 of the RSS 560 on RSS server 506, developers of security service providers can upload or otherwise create or publish security service description(s) to list their security service(s) on the service catalog 563. The user 501 can then utilize the user interface 561 (e.g., an RSS portal) to see available security services in the service catalog 563. Once a security service instance is provisioned, the user 501 would then be able to attach that security service instance to one of their registered client devices (e.g., client device 302).

The RSC 442 running on the SCS 440 of the SCHW 304 communicates with the remote services 565 (e.g., as illustrated in FIG. 5) to determine or detect if any security service instances (or other service instances) are attached to the client device 302 that the SCHW 304 is currently connected to. If so, the RSC 442 will download associated network emulation modules from the service registry 567 (if needed).

The SCS 440 of the SCHW 304 will then execute such network emulation modules as the network emulation modules 1044 shown in FIG. 10, as orchestrated by the RSC 442. When the client device 302, via the host OS 321, signals over fabrics 303 to determine what type of functionality is provided by the SCHW 304, the SCHW 304 will respond with a set of capabilities including network emulation. The host OS 321 will then utilize its host drivers 422 (e.g., NIC drivers) to communicate with the network emulation modules 1044.

At runtime, the host OS 321 of the client device 302 makes network requests (e.g., requests to access different URIs on a network) via the fabrics 303 (e.g., using the host drivers 422 which would normally be used for communication with a physical NIC that the network emulation modules 1044 are emulating). The network emulation modules 1044 actively running on the SCS 440 of the SCHW 304 will receive and process the network requests utilizing the remote security services 1065 running on the RSS 560 of the RSS server 506 (e.g., to perform network traffic filtering or other security tasks).

The remote security services 1065 can be orchestrated via the orchestration platform 661 at the RSS server 506, which may be at a remote computing site relative to the client device 302 and SCHW 304 (e.g., the RSS server 506 may comprise or be part of an edge computing site, a cloud computing platform, etc.). To deploy security services via the RSS 560, developers of the security service providers will deploy a security service description (e.g., for entry into service catalog 563 of the RSS 560), a remote security service (e.g., as one of remote services 565 of the RSS 560, shown in FIG. 10 as security services 1065), and a network emulation module (e.g., for entry into service registry 567 of the RSS 560).

Registration of client devices such as client device 302 with the RSS 560 is described above. When a user 501 obtains a new client device (e.g., client device 302), a pre-defined unique device identifier will be used to identify that client device and register it with the RSS 560 via the user interface 561. The user 501 may have multiple associated client devices, and client devices may also be organized into groups and hierarchies (e.g., in accordance with an enterprise organizational structure) for ease of management.

To provision remote security services 1065, the user 501 logs into the RSS 560 to provision security service instances via the user interface 561. Once a security service instance is provisioned, the user 501 can attach that security service instance to a client device. In a similar manner (e.g., via user interface 561 of the RSS 560), security service instances can be detached from client devices and de-provisioned.

When the user turns on client device 302, the SCHW 304 may also be turned on (as described elsewhere herein, in some embodiments the SCHW 304 may be turned on and off independently of the client device 302 it is attached to). After SCS 440 is booted on the SCHW 304, the RSC 442 will connect with the RSS 560 on RSS server 506 using the unique device identifier of the client device 302 to determine if any remote services 565 (e.g., such as remote security services 1065) are attached to the client device 302. If a new service instance is attached, the RSC 442 will download the corresponding emulation module from the service registry 567 of the RSS 560. That emulation module would then be executed on the SCS 440 (e.g., as emulation modules 444 or network emulation modules 1044). When a user detaches a service instance (e.g., including a security service instance) from the client device 302, the associated emulation modules running on the SCS 440 of the SCHW 304 will be shut down and deleted from the SCS 440.

Figure 11:
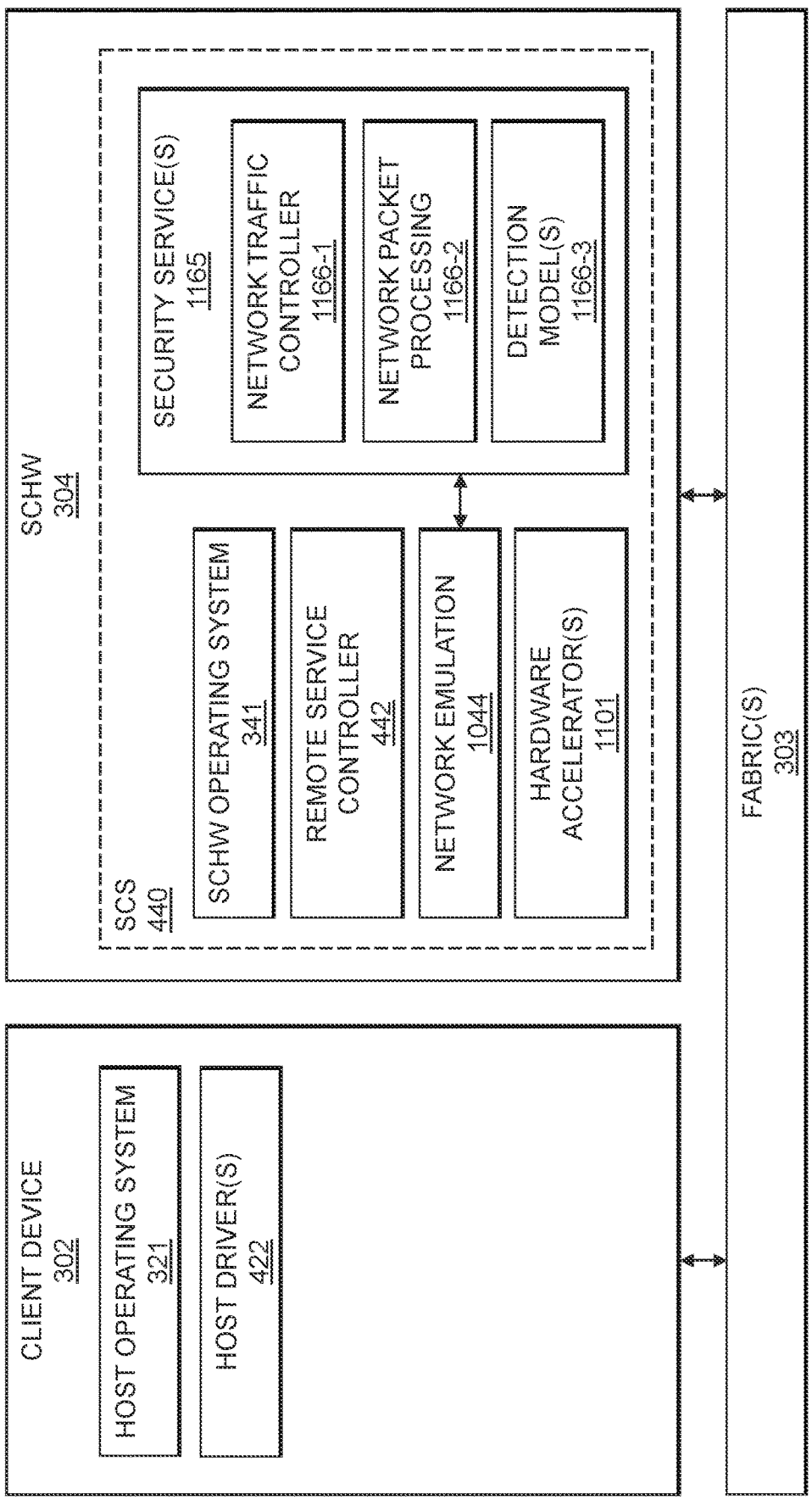
FIG. 11 shows provisioning of security services on a client device with local execution of the security services utilizing hardware accelerators of service controller hardware in an illustrative embodiment.

At the host driver 422 level, the network emulation modules 1044 of the SCHW 304 will appear as one or more standard NICs. FIG. 11 shows a software architecture running in the SCHW 304 for provisioning remote security services, shown as security services 1165. Although shown in FIG. 11 as being implemented internal to the SCHW 304, the security services 1165 may also or alternatively run at a remote computing site (e.g., as remote security services 1065 on RSS 560 of RSS server 506 as shown in FIG. 10, where the RSS server 506 may comprise or be implemented as part of one or more edge computing sites, one or more cloud computing platforms, or combinations thereof). In the FIG. 11 example, the security services 1165 include a network traffic controller component 1166-1, a network packet processing component 1166-2, and one or more network traffic pattern detection models 1166-3. The security services 1165 running on the SCHW 304 may leverage one or more hardware accelerators 1101 of the SCHW 304. The hardware accelerators 1101 (also referred to herein as "mini-accelerators") may include GPUs, ASICs, encryption chips, etc., which can be orchestrated by the RSC 442 of the SCS 440 to speed up processing of network traffic (e.g., network packets) that is performed as part of the security services 1165.

The security services 1165 (or remote security services 1065) may provide what is referred to herein as Client Security as a Service (CSaaS). If the user 501 signs up for CSaaS at the RSS 560 marketplace (e.g., the user 501 provisions and attaches CSaaS to one or more client devices including client device 302 via the user interface 561 of RSS 560), the security services 1165 (or remote security services 1065) are deployed to run in the SCHW 304 by the RSC 442. The security services 1165, as shown in FIG. 11, include a network traffic controller component 1166-1. When outgoing network traffic (e.g., network packets) is passed to the network emulation modules 1044 via the host drivers 422 of the host OS 321 of the client device 302, the network traffic controller component 1166-1 will intercept such network traffic and perform various desired processing (e.g., as provided by the particular type of CSaaS that is provisioned). Such processing may include determining the destination of outgoing traffic or otherwise analyzing network traffic patterns using network packet processing component 1166-2.

Based on the security settings configured for the client device 302 by the provisioned security services 1165, different security mechanisms can be applied by the network traffic controller component 1166-1. By using this design of a network traffic controller component 1166-1 within security services 1165 deployed on SCHW 304, security measures can be deployed and executed outside of the host OS 321 of the client device 302, and would appear at a hardware level as a physical NIC via the network emulation modules 1044. The host OS 321 of the client device 302 can therefore be reinstalled or swapped to different versions, distributions, platforms, etc., while maintaining consistent CSaaS.

In some embodiments, the network traffic processing component 1166-2 performs an outgoing traffic scan with multi-level access control list caching. The number of entries (e.g., whitelisted and/or blacklisted URIs) in an access control list may be very large, such that the overall size of the access control list makes it difficult or not feasible to maintain locally at the client device 302 or SCHW 304. Through multi-level access control list caching, different portions (e.g., potentially overlapping subsets of the entries of an access control list) are stored at different levels (e.g., the SCHW 304 level, one or more edge computing site levels, one or more cloud computing platform levels, etc.). The number of levels may be dynamically configurable. Based on the storage and memory capabilities or available resources of the sites at different levels, the size of the portions of the access control list that are cached at such different levels will vary.

Figure 12:
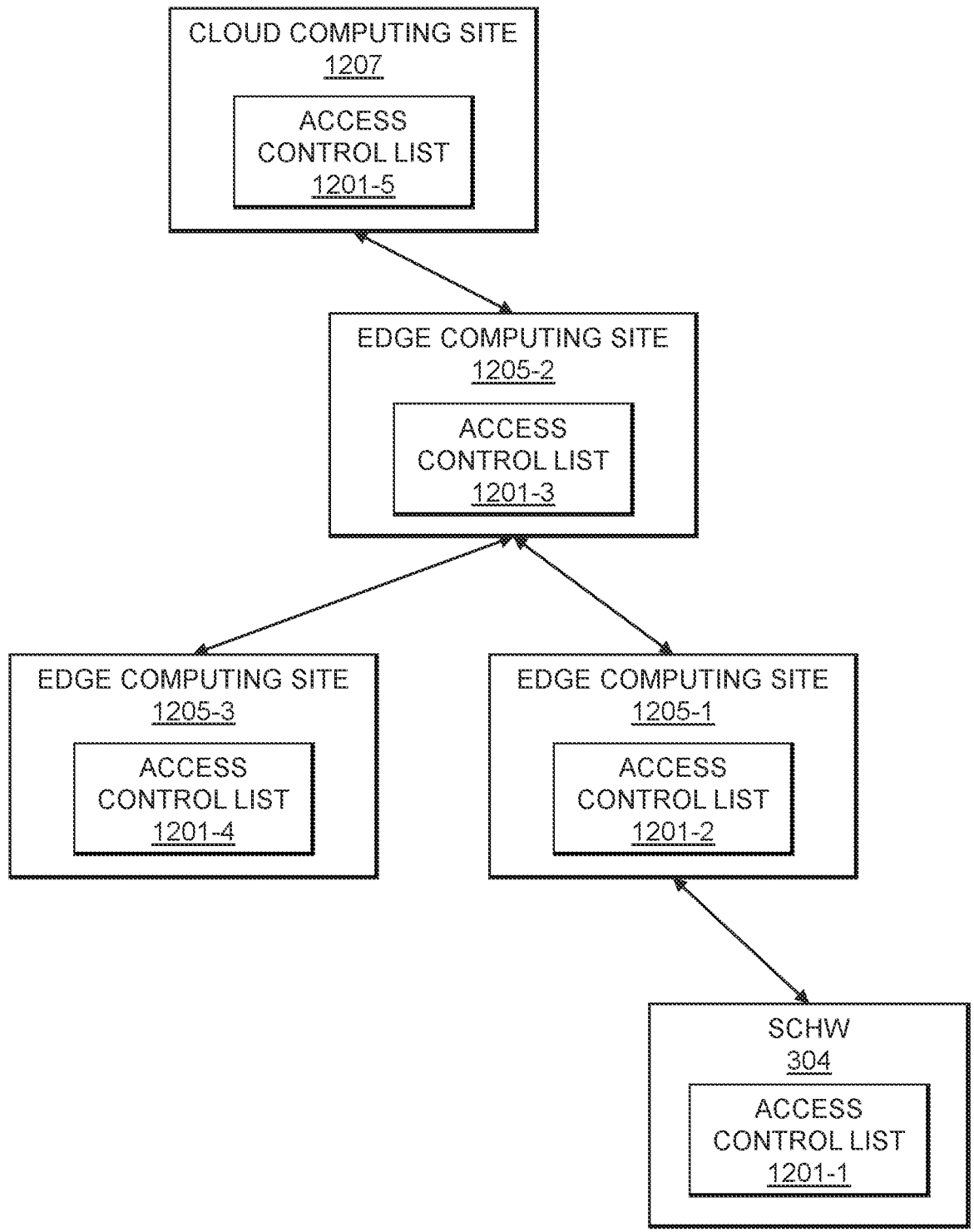
FIG. 12 shows a multi-level cache implementation for an access list utilized in provisioning of security services on a client device in an illustrative embodiment.

FIG. 12 shows an example of multi-level access control list caching, with the SCHW 304 at a first level implementing an access control list portion 1201-1, edge computing sites 1205-1, 1205-2 and 1205-3 at a second level implementing respective access control list portions 1201-2, 1201-3 and 1201-4, and a cloud computing site 1207 at a third level implementing an access control list portion 1201-5. When a lookup is required, the SCHW 304 will first look to the access control list portion 1201-1 maintained in its local cache. If an answer cannot be found locally, the SCHW 304 will reach out to its closest edge station (e.g., edge computing site 1205-1 in the FIG. 12 example) for the answer. If the access control list portion 1201-2 maintained in a local cache of the edge computing site 1205-1 does not have the answer, it will reach out to its parent which in the FIG. 12 example is the edge computing site 1205-2. This process will repeat until eventually reaching the top level of the multi-level access control list caching hierarchy, which in the FIG. 12 example is the cloud computing site 1207. The access control list portion 1201-5 maintained at the cloud computing site 1207 (e.g., the top level of the multi-level access control list caching hierarchy in the FIG. 12 example) will have all the answers (e.g., access to a complete version of the access control list, either directly in its local cache or via access to other branches of the multi-level access control list caching hierarchy).

The answer would then be propagated down through the multi-level access control list caching hierarchy until reaching the SCHW 304. At each step, the answers may be locally cached for future usage (e.g., in accordance with cache replacement algorithms implemented at the different nodes in each level of the multi-level access control list caching hierarchy). As each local cache runs out of space, different types of cache replacement algorithms (e.g., eviction algorithms) can be used to effectively manage the local caches to be within memory and/or storage limitations at each of the nodes. The Least Recently Used (LRU) cache replacement algorithm provides a simple but effective mechanism for managing evictions. Various other types of cache replacement algorithms may be used in other embodiments, including but not limited to a Least Frequently Used (LFU) cache replacement algorithm. In some embodiments, different nodes in the multi-level access control list caching hierarchy use different cache replacement algorithms (e.g., the SCHW 304 may use LRU, while the edge computing site 1205-1 uses LFU).

If a requested URI is identified as a blocked entry in the access control list, outgoing network traffic to that URI will be stopped as a security measure by the network traffic controller component 1166-1. An entry for that URI will be cached locally at the SCHW 304 (e.g., if appropriate in accordance with the cache replacement algorithm implemented by the SCHW 304) to speed up future lookup (e.g., such that future lookups to that URI do not require communication with other levels of the multi-level access control list caching hierarchy). When new entries (e.g., new blocked URIs) are added to an access control list, such new entries may be added to a top level of the multi-level access control list caching hierarchy so that the new entries can be quickly populated down the branches of the multi-level access control list caching hierarchy as access requests to the URIs specified in such new entries are made.

As network security has a real-time nature (e.g., traffic patterns such as Distributed Denial of Service (DDoS) or other Denial of Service (DoS) attacks should be detected in real-time), a network of alerts is important. When an attack is ongoing, alerts should be made to different components. For example, if a first site at which a client device 302 coupled to SCHW 304 is operating is undergoing an unusual volume of network traffic (or other malicious or potentially malicious network traffic pattern), it may be identified as being under attack and may automatically notify other components such as the remote security services 1065 operating on RSS 560 of RSS server 506 (e.g., which may comprise or be implemented using one or more edge computing sites and/or one or more cloud computing platforms). The remote security services 1065 running on the RSS 560 of RSS server 506 may notify network traffic controller components running in SCHW coupled to other client devices about such attacks. These notifications may include or identify the unusual network traffic patterns associated with the attack, which may be used to update network traffic pattern detection models maintained at each SCHW (e.g., network traffic pattern detection models 1166-3 for SCHW 304). The network traffic pattern detection models may be implemented utilizing various artificial intelligence (AI) or machine learning algorithms, including but not limited to deep neural networks (DNNs), decision trees, etc.

The network traffic pattern detection models (e.g., network traffic pattern detection models 1166-3) are executed in the SCHW (e.g., SCHW 304) by a network traffic controller component (e.g., network traffic controller component 1166-1 of security services 1165) to determine if the host OS of its associated client device (e.g., host OS 321 of client device 302) is part of or has contributed to the attack. If so, then the client device would be flagged on the RSS 560, so that designated users (e.g., IT administrators of an enterprise or other entity that is associated with a group of client devices to which CSaaS instances have been attached) are made aware of the attack. Various automated remedial actions may be applied to remediate the client devices that are part of or subject to attack. In some cases, the SCHW is configured to stop further outgoing network traffic from associated client devices that are under attack (e.g., such that the client devices do not become, or cease acting as, zombie computers contributing to an attack, so that the attack volume can be reduced).

The network traffic pattern detection models (e.g., network traffic pattern detection models 1166-3) that operate as part of CSaaS instances or other security services (e.g., security services 1065 and/or security services 1165) are configured to identify and distinguish regular or normal network traffic patterns from unusual (e.g., malicious or potentially malicious) network traffic patterns. For example, if the client device 302 is under or part of a DDoS attack, this does not mean that all network traffic to and/or from the client device 302 is necessarily part of the DDoS attack. Regular user-generated traffic to and/or from the client device 302 that is not part of the DDoS attack should continue to proceed without any flag or disruption by the security services (e.g., remote security services 1065 and/or security services 1165). Network traffic pattern detection models (e.g., network traffic pattern detection models 1166-3) may be executed periodically to determine if a client device (e.g., client device 302), to which CSaaS instances or other security service instances are attached (e.g., as remote security services 1065 and/or security services 1165), is participating in any attack in the future. In some embodiments, multiple network traffic pattern detection models are implemented for analyzing different types of malicious or potentially malicious network traffic patterns. When an attack is no longer taking place, the attacked site or device can notify the remote security services 1065 running on RSS 560, so that one or more of the network traffic pattern detection models may be de-provisioned if desired.

In some cases, a SCHW may run out of or not have sufficient computational resources to execute one or more network traffic pattern detection models. In such cases, the SCHW may provide information for filtering historical outgoing network traffic data from a client device that is captured by an associated network traffic controller component to reduce the overall data size, and such filtered historical outgoing network traffic data can be transmitted to edge stations or cloud infrastructure to execute the one or more network traffic pattern detection models. Results of execution of the one or more network traffic pattern detection models can then be sent back to the network traffic controller component to control future outgoing network traffic pattern from the client device.

Figure 13:
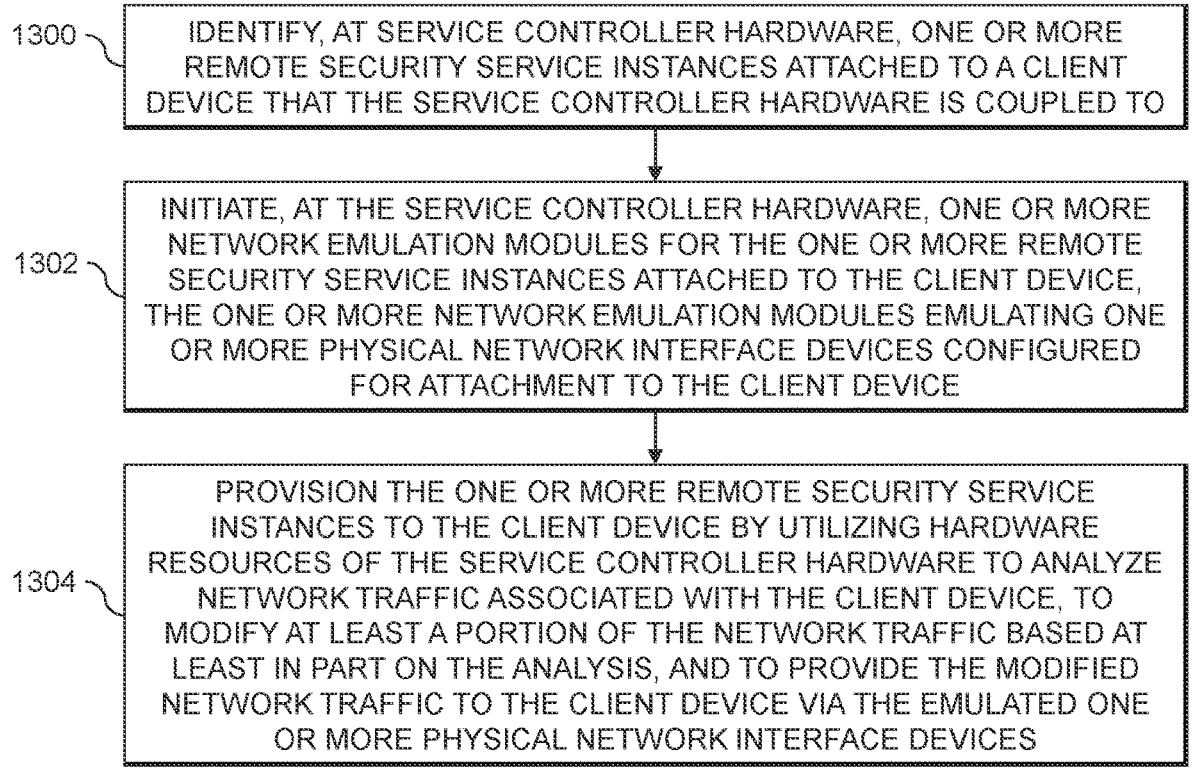
FIG. 13 is a flow diagram of an exemplary process for provisioning remote security services on client devices using physical hardware controllers attached thereto in an illustrative embodiment.

An exemplary process for provisioning security services to client devices using physical hardware controllers attached thereto will now be described in more detail with reference to the flow diagram of FIG. 13. It is to be understood that this particular process is only an example, and that additional or alternative processes for provisioning security services to client devices using physical hardware controllers attached thereto can be carried out in other embodiments.

In this embodiment, the process includes steps 1300 through 1304. These steps are assumed to be performed by the SCHW 104 and RSS server 106 utilizing the remote service emulation logic 140 and remote service provisioning logic 160. The process begins with step 1300, identifying at SCHW (e.g., SCHW 104, SCHW 304) one or more remote security service instances attached to the client device (e.g., client devices 102, client device 302) that the SCHW is coupled to. Step 1300 may comprise obtaining a device identifier of the client device and determining, utilizing the obtained device identifier of the client device, the one or more remote security service instances attached to the client device. Determining the one or more remote security service instances attached to the client device may utilize an RSS server (e.g., RSS server 506), the one or more network emulation modules being downloaded from the RSS server.

In step 1302, one or more network emulation modules are initiated at the SCHW for the one or more remote security service instances attached to the client device, the one or more network emulation modules emulating one or more physical network interface devices configured for attachment to the client device.

In step 1304, the one or more remote security service instances are provisioned to the client device by utilizing hardware resources of the physical hardware controller to analyze network traffic associated with the client device, to modify at least a portion of the network traffic based at least in part on the analysis, and to provide the modified network traffic to the client device via the emulated one or more physical network interface devices. At least a portion of the analysis of the network traffic associated with the client device is offloaded from the hardware resources of the SCHW to a computing site (e.g., an RSS server such as RSS server 506, one or more edge computing sites, one or more cloud computing platforms, etc.) remote from the SCHW and the client device.

In some embodiments, the network traffic associated with the client device comprises one or more network access requests originating at the client device. Analyzing the network traffic associated with the client device may comprise identifying one or more destination network addresses (e.g., URIs) for the one or more network access requests and determining whether any of the one or more destination network addresses are identified in an access control list (e.g., as potentially malicious). Modifying at least a portion of the network traffic based at least in part on the analysis may comprise blocking ones of the one or more network access requests that are directed to destination network addresses identified as potentially malicious in the access control list. In some embodiments, the access control list is stored in local caches across two or more levels of a multi-level caching hierarchy. At least a first portion of the access control list may be stored in a first local cache of the SCHW providing a first level of the multi-level caching hierarchy, and at least a second portion of the access control list may be stored in at least a second local cache of one or more computing sites (e.g., an RSS server such as RSS server 506, one or more edge computing sites, one or more cloud computing platforms, etc.) remote from the SCHW and the client device. The first and second portions of the access control list may comprise disjoint subsets of a plurality of destination network addresses identified as potentially malicious in the access control list.

In some embodiments, analyzing the network traffic associated with the client device comprises utilizing one or more network traffic pattern detection models. Analyzing the network traffic associated with the client device may comprise filtering the network traffic to reduce an overall data size of the network traffic, and providing the filtered network traffic to one or more computing sites (e.g., an RSS server such as RSS server 506, one or more edge computing sites, one or more cloud computing platforms, etc.) remote from the SCHW and the client device, the one or more remote computing sites executing the one or more network traffic pattern detection models. Analyzing the network traffic associated with the client device may comprise utilizing the one or more network traffic pattern detection models to determine that at least a portion of the network traffic associated with the client device is part of an attack. Modifying at least a portion of the network traffic based at least in part on the analysis may comprise blocking the portion of the network traffic associated with the client that is part of the attack and allowing one or more other portions of the network traffic associated with the client device not determined to be part of the attack. Responsive to determining that the portion of the network traffic associated with the client device is part of the attack, one or more updated network traffic pattern detection models may be generated for utilization by remote security service instances attached to one or more additional client devices that are associated with a same enterprise as the client device.

SCHW provides a technical solution enabling built-in security services support for network traffic to and from a client device that the SCHW is attached to. CSaaS or other security services can advantageously provide security support which is emulated at the hardware level via emulation modules on SCHW that appear to the host OS of the client device as regular or standard physical NICs, which the host OS of the client device interacts with utilizing its host drivers (e.g., without any custom software installed). Various security mechanisms may be provided using SCHW, including but not limited to: monitoring outgoing traffic URI access requests with access control lists; network traffic pattern detection; etc. Processing for such security mechanisms can advantageously be offloaded from the client device to its attached SCHW (and potentially from the SCHW to one or more remote computing sites). This frees up host resources of the client device, and also prevents a compromised client device from causing further damage (e.g., as part of one or more attacks detected by unusual network traffic patterns representing malicious or potentially malicious network traffic activity).

In some embodiments, SCHW can implement one level or part of a multi-level caching mechanism for an access control list that is utilized to filter outgoing network traffic. By utilizing SCHW along with edge computing sites and cloud computing infrastructure, the huge number of entries of an access control list can be distributed across multiple components, with each component managing its own local cache individually (e.g., using its own cache replacement algorithm). The multi-level caching mechanism enables outgoing network traffic to be kept safe, while leveraging the resources of remote computing sites (e.g., such as edge computing infrastructure that offers quick access from client devices further improving performance and reducing traffic volume to a centralized cloud). With caching capability at the SCHW (or at edge computing sites close to the SCHW), network traffic can be blocked or filtered locally so that performance can be further improved.

The technical solutions described herein further provide mechanisms for SCHW attached to client devices to obtain network traffic pattern detection models that can be used for monitoring ongoing attacks in an automated fashion. Further, the network traffic pattern detection models can be executed within the SCHW by utilizing historical network traffic data (e.g., captured by a network traffic controller component of security services executing locally on the SCHW). This design offloads the computation of network traffic pattern detection into SCHW so that it does not consume host resources of an attached client device. Further, even if a host OS of the client device is compromised, since the SCHW is locked down (e.g., independent of its attached client device), network traffic that is part of attacks or other malicious network traffic patterns will still be stopped to prevent the client device from causing further damage. In cases where the SCHW does not have sufficient computational resources to execute the network traffic pattern detection models, the network traffic pattern detection model execution may be offloaded from the SCHW to one or more remote computing sites (e.g., one or more edge computing sites, one or more cloud computing platforms, combinations thereof, etc.). The historical data of outgoing network traffic, for example, can be filtered down into a manageable chunk of data by the SCHW, with that chunk of data being transmitted to the remote computing sites for execution of the network traffic pattern detection models.

Remote provisioning of security services utilizing SCHW provides various technical solutions enabling an organization, enterprise or other entity that does not have control over a client device (or the host OS installed thereon) to offer CSaaS via emulating physical network devices (e.g., NICs) attached to the client device. This capability provides differentiated secured client devices. Remotely provisioned security services offered by an enterprise or other entity can also provide additional revenue streams from cloud and edge services.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for provisioning services on client devices using physical hardware controllers attached thereto will now be described in greater detail with reference to FIGS. 14 and 15. Although described in the context of system 100, these platforms may also be used to implement at least portions of other information processing systems in other embodiments.

Figure 14:
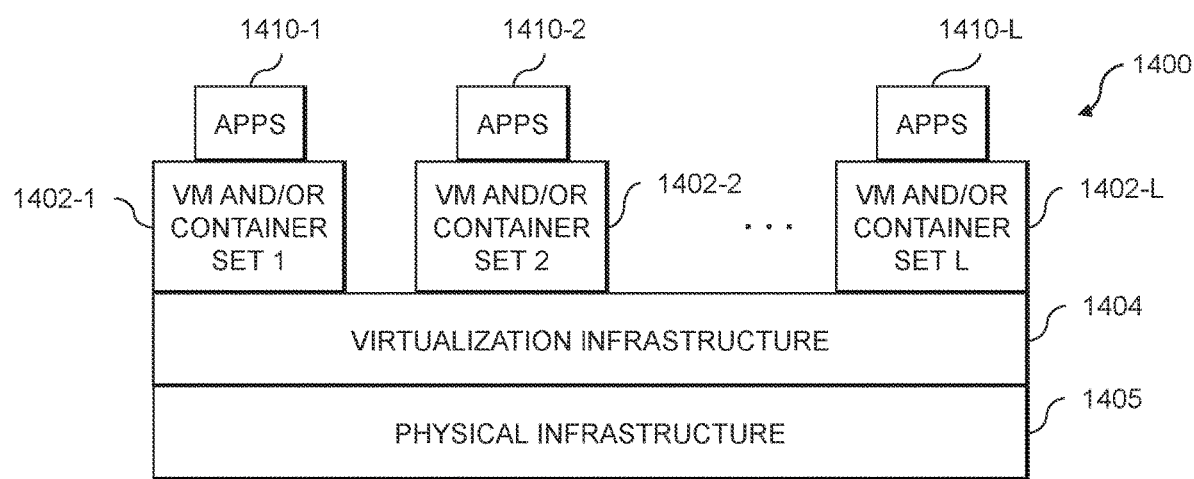
FIGS. 14 and 15 show examples of processing platforms that may be utilized to implement at least a portion of an information processing system in illustrative embodiments.
Figure 15:
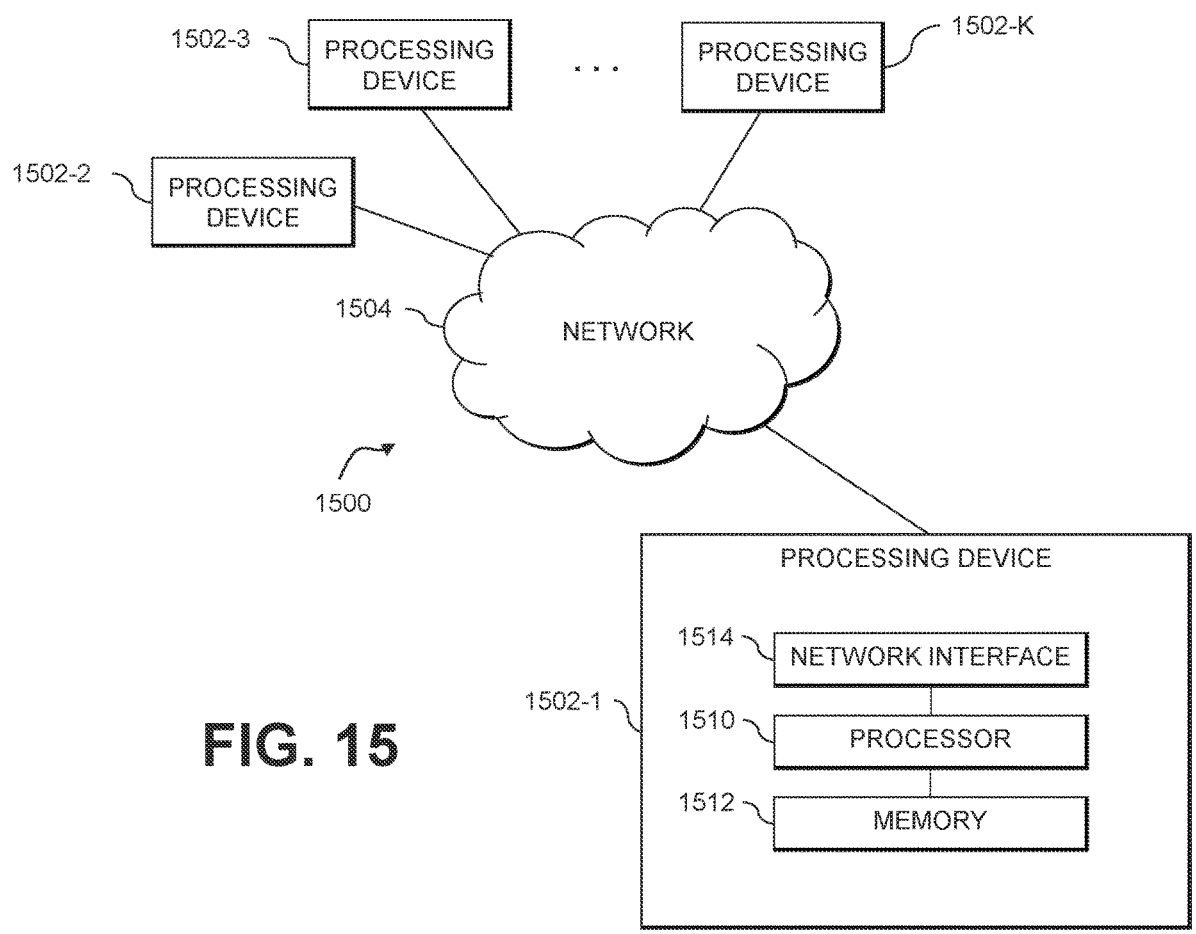

FIG. 14 shows an example processing platform comprising cloud infrastructure 1400. The cloud infrastructure 1400 comprises a combination of physical and virtual processing resources that may be utilized to implement at least a portion of the information processing system 100 in FIG. 1. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for provisioning services on client devices using physical hardware controllers attached thereto as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, SCHW hardware, fabric connections, services, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   a first processing device comprising a physical hardware controller;
   the first processing device being configured for coupling with a second processing device;
   the physical hardware controller being configured to perform steps of:
      identifying one or more remote security service instances attached to the second processing device;
      initiating, at the first processing device, one or more network emulation modules for the one or more remote security service instances attached to the second processing device, the one or more network emulation modules emulating one or more physical network interface devices configured for attachment to the second processing device; and
      provisioning the one or more remote security service instances to the second processing device by utilizing hardware resources of the physical hardware controller, instead of hardware resources of the second processing device, to analyze network traffic associated with the second processing device, to modify at least a portion of the network traffic based at least in part on the analysis, and to provide the modified network traffic to the second processing device via the emulated one or more physical network interface devices;
   wherein analyzing the network traffic associated with the second processing device comprises utilizing a data structure distributed across two or more levels of a multi-level hierarchy, at least a first portion of the data structure providing a first one of the two or more levels of the multi-level hierarchy being stored by the first processing device and at least a second portion of the data structure providing a second one of the two or more levels of the multi-level hierarchy being stored in one or more computing sites remote from the first processing device and the second processing device, the first and second portions of the data structure comprising disjoint subsets of network information utilized for modifying said at least a portion of the network traffic, the second portion of the data structure being larger than the first portion of the data structure;

wherein analyzing the network traffic associated with second processing device comprises, for a given portion of the network traffic associated with the second processing device;

querying, by the physical hardware controller, the first portion of the data structure to determine whether one or more network addresses associated with the given portion of the network traffic are present in the first portion of the data structure; and responsive to determining that at least one of the one or more network addresses associated with the given portion of the network traffic is not present in the first portion of the data structure, (i) sending, from the physical hardware controller to at least one of the one or more remote computing sites, a request to query the second portion of the data structure and (ii) receiving, at the physical hardware controller from said at least one of the one or more remote computing sites, a result of the query to the second portion of the data structure.

2. The apparatus of claim 1 wherein the network traffic associated with the second processing device comprises one or more network access requests originating at the second processing device.

3. The apparatus of claim 2 wherein analyzing the network traffic associated with the second processing device comprises identifying one or more destination network addresses for the one or more network access requests and determining whether any of the one or more destination network addresses are identified as potentially malicious in an access control list maintained in the data structure.

4. The apparatus of claim 3 wherein modifying said at least a portion of the network traffic based at least in part on the analysis comprises blocking ones of the one or more network access requests that are directed to destination network addresses identified as potentially malicious in the access control list.

5. The apparatus of claim 3 wherein the access control list is stored in local caches across the two or more levels of the multi-level hierarchy of the data structure, at least a first portion of the access control list being stored in a first local cache of the first processing device providing the first portion of the data structure, and at least a second portion of the access control list being stored in at least a second local cache of the second portion of the data structure, the first and second portions of the access control list comprising disjoint subsets of a plurality of destination network addresses identified as potentially malicious in the access control list.

6. The apparatus of claim 1 wherein analyzing the network traffic associated with the second processing device comprises utilizing one or more network traffic pattern detection models.

7. The apparatus of claim 6 wherein analyzing the network traffic associated with the second processing device comprises filtering the network traffic to reduce an overall data size of the network traffic, and providing the filtered network traffic to one or more computing sites remote from the first processing device and the second processing device that execute the one or more network traffic pattern detection models.

8. The apparatus of claim 6 wherein analyzing the network traffic associated with the second processing device comprises utilizing the one or more network traffic pattern detection models to determine that at least a portion of the network traffic associated with the second processing device is part of an attack.

9. The apparatus of claim 8 wherein modifying said at least a portion of the network traffic based at least in part on the analysis comprises blocking the portion of the network traffic associated with the second processing device that is part of the attack and allowing one or more other portions of the network traffic associated with the second processing device not determined to be part of the attack.

10. The apparatus of claim 8 wherein responsive to determining that the portion of the network traffic associated with the second processing device is part of the attack, generating one or more updated network traffic pattern detection models for utilization by remote security service instances attached to one or more additional processing devices that are associated with a same enterprise as the first processing device.

11. The apparatus of claim 1 wherein the first processing device is one of: internally coupled to the second processing device as an embedded component of the second processing device; and externally coupled to the second processing device as an external pluggable component.

12. The apparatus of claim 1 wherein identifying the one or more remote security service instances attached to the second processing device comprises:

obtaining a device identifier of the second processing device; and determining, utilizing the obtained device identifier of the second processing device, the one or more remote security service instances attached to the second processing device.

13. The apparatus of claim 12 wherein determining the one or more remote security service instances attached to the second processing device utilizes a remote service software server, the one or more network emulation modules being downloaded from the remote service software server.

14. The apparatus of claim 1 wherein at least a portion of the analysis of the network traffic associated with the second processing device is offloaded from the hardware resources of the physical hardware controller of the first processing device to at least one of the one or more computing sites remote from the first processing device and the second processing device.

15. A computer program product comprising a non-transitory processor-readable storage medium having stored therein program code of one or more software programs, wherein the program code when executed by a first processing device comprising a physical hardware controller causes the first processing device to perform steps of:

identifying one or more remote security service instances attached to a second processing device that the physical hardware controller is coupled to;

initiating, at the first processing device, one or more network emulation modules for the one or more remote security service instances attached to the second processing device, the one or more network emulation modules emulating one or more physical network interface devices configured for attachment to the second processing device; and provisioning the one or more remote security service instances to the second processing device by utilizing hardware resources of the physical hardware controller, instead of hardware resources of the second processing device, to analyze network traffic associated with the second processing device, to modify at least a portion of the network traffic based at least in part on the analysis, and to provide the modified network traffic to the second processing device via the emulated one or more physical network interface devices;

wherein analyzing the network traffic associated with the second processing device comprises utilizing a data structure distributed across two or more levels of a multi-level hierarchy, at least a first portion of the data structure providing a first one of the two or more levels of the multi-level hierarchy being stored by the first processing device and at least a second portion of the data structure providing a second one of the two or more levels of the multi-level hierarchy being stored in one or more computing sites remote from the first processing device and the second processing device, the first and second portions of the data structure comprising disjoint subsets of network information utilized for modifying said at least a portion of the network traffic, the second portion of the data structure being larger than the first portion of the data structure;

wherein analyzing the network traffic associated with second processing device comprises, for a given portion of the network traffic associated with the second processing device:

querying, by the physical hardware controller, the first portion of the data structure to determine whether one or more network addresses associated with the given portion of the network traffic are present in the first portion of the data structure; and responsive to determining that at least one of the one or more network addresses associated with the given portion of the network traffic is not present in the first portion of the data structure, (i) sending, from the physical hardware controller to at least one of the one or more remote computing sites, a request to query the second portion of the data structure and (ii) receiving, at the physical hardware controller from said at least one of the one or more remote computing sites, a result of the query to the second portion of the data structure.

16. The computer program product of claim 15 wherein identifying the one or more remote security service instances attached to the second processing device comprises:

obtaining a device identifier of the second processing device; and determining, utilizing the obtained device identifier of the second processing device, the one or more remote security service instances attached to the second processing device.

17. The computer program product of claim 15 wherein at least a portion of the analysis of the network traffic associated with the second processing device is offloaded from the hardware resources of the physical hardware controller of the first processing device to at least one of the one or more computing sites remote from the first processing device and the second processing device.

18. A method comprising:

identifying, at a first processing device comprising a physical hardware controller coupled to a second processing device, one or more remote security service instances attached to the second processing device;

initiating, at the first processing device, one or more network emulation modules for the one or more remote security service instances attached to the second processing device, the one or more network emulation modules emulating one or more physical network interface devices configured for attachment to the second processing device; and provisioning the one or more remote security service instances to the second processing device by utilizing hardware resources of the physical hardware controller, instead of hardware resources of the second processing device, to analyze network traffic associated with the second processing device, to modify at least a portion of the network traffic based at least in part on the analysis, and to provide the modified network traffic to the second processing device via the emulated one or more physical network interface devices;

wherein the method is performed by the first processing device;

wherein analyzing the network traffic associated with the second processing device comprises utilizing a data structure distributed across two or more levels of a multi-level hierarchy, at least a first portion of the data structure providing a first one of the two or more levels of the multi-level hierarchy being stored by the first processing device and at least a second portion of the data structure providing a second one of the two or more levels of the multi-level hierarchy being stored in one or more computing sites remote from the first processing device and the second processing device, the first and second portions of the data structure comprising disjoint subsets of network information utilized for modifying said at least a portion of the network traffic, the second portion of the data structure being larger than the first portion of the data structure; and wherein analyzing the network traffic associated with second processing device comprises, for a given portion of the network traffic associated with the second processing device:

querying, by the physical hardware controller, the first portion of the data structure to determine whether one or more network addresses associated with the given portion of the network traffic are present in the first portion of the data structure; and responsive to determining that at least one of the one or more network addresses associated with the given portion of the network traffic is not present in the first portion of the data structure, (i) sending, from the physical hardware controller to at least one of the one or more remote computing sites, a request to query the second portion of the data structure and (ii) receiving, at the physical hardware controller from said at least one of the one or more remote computing sites, a result of the query to the second portion of the data structure.

19. The method of claim 18 wherein identifying the one or more remote security service instances attached to the second processing device comprises:

obtaining a device identifier of the second processing device; and determining, utilizing the obtained device identifier of the second processing device, the one or more remote security service instances attached to the second processing device.

20. The method of claim 18 wherein at least a portion of the analysis of the network traffic associated with the second processing device is offloaded from the hardware resources of the physical hardware controller of the first processing device to at least one of the one or more computing sites remote from the first processing device and the second processing device.

* * * * *